(12) United States Patent
Mazur et al.

(10) Patent No.: US 11,673,762 B2
(45) Date of Patent: *Jun. 13, 2023

(54) FISH TAPE CASE, AND FISH TAPE HOUSED THEREIN

(71) Applicant: GREENLEE TOOLS, INC., Rockford, IL (US)

(72) Inventors: Janine Victoria Mazur, Cambridge, MA (US); William Nordlin, Poplar Grove, IL (US); John Hagan, Roscoe, IL (US); John Wayne Kroening, Machesney Park, IL (US)

(73) Assignee: GREENLEE TOOLS, INC., Rockford, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/825,655

(22) Filed: May 26, 2022

(65) Prior Publication Data

US 2022/0281711 A1 Sep. 8, 2022

Related U.S. Application Data

(63) Continuation of application No. 17/440,645, filed as application No. PCT/US2020/032104 on May 8, 2020, now Pat. No. 11,365,085.

(60) Provisional application No. 62/899,374, filed on Sep. 12, 2019, provisional application No. 62/846,517, filed on May 10, 2019.

(51) Int. Cl.
*B65H 75/36* (2006.01)
*H02G 1/08* (2006.01)

(52) U.S. Cl.
CPC ..... *B65H 75/364* (2013.01); *B65H 2402/412* (2013.01); *B65H 2407/22* (2013.01); *B65H 2701/376* (2013.01); *H02G 1/083* (2013.01)

(58) Field of Classification Search
None
See application file for complete search history.

(56) References Cited

U.S. PATENT DOCUMENTS

| | | |
|---|---|---|
| 2,689,709 A | 9/1954 | Waldschmidt |
| 3,067,984 A | 12/1962 | Linden |
| 3,424,435 A | 1/1969 | Niemann |
| 3,601,330 A | 8/1971 | Minobe |
| 5,056,731 A | 10/1991 | Koehn |
| 5,106,056 A | 4/1992 | Crates et al. |
| 5,110,092 A | 5/1992 | Blaha et al. |
| 5,201,495 A | 4/1993 | Crates et al. |
| 5,280,861 A | 1/1994 | Corriveau |
| D351,561 S | 10/1994 | Moffatt et al. |
| 5,423,516 A | 6/1995 | Blaha |

(Continued)

OTHER PUBLICATIONS

International Search Report for International Application No. PCT/US20/32104 dated Aug. 11, 2020, 2 pages.

(Continued)

*Primary Examiner* — William A. Rivera
(74) *Attorney, Agent, or Firm* — Klintworth & Rozenblat IP LLP

(57) ABSTRACT

A fish tape case is configured to house a fish tape in accordance with some example embodiments is provided. The fish tape includes a shell having a rotatable tray therein. A fish tape extends through openings in the shell and the tray. The fish tape case does not include a handle.

20 Claims, 16 Drawing Sheets

(56) References Cited

U.S. PATENT DOCUMENTS

| | | | |
|---|---|---|---|
| 5,649,674 | A | 7/1997 | Cielker |
| D396,012 | S | 7/1998 | Walsten |
| D408,749 | S | 4/1999 | Walsten |
| D474,397 | S | 5/2003 | Plummer |
| 6,722,603 | B1 | 4/2004 | Atencio |
| 7,100,900 | B2 | 9/2006 | Radle et al. |
| 8,651,459 | B2 | 2/2014 | Axon et al. |
| 9,417,054 | B2 | 8/2016 | Moffatt et al. |
| 11,365,085 | B2 * | 6/2022 | Mazur .................. B65H 75/364 |
| 2006/0065883 | A1 | 3/2006 | Radle et al. |
| 2007/0272905 | A1 | 11/2007 | Ziebart et al. |
| 2011/0133142 | A1 | 6/2011 | Axon et al. |
| 2011/0155839 | A1 | 6/2011 | Wells |
| 2019/0292005 | A1 | 9/2019 | Miller et al. |

OTHER PUBLICATIONS

International Search Report for International Application No. PCT/US20/50341 dated Dec. 21, 2020, 2 pages.
Written Opinion for International Application No. PCT/US20/32104 dated Aug. 11, 2020, 5 pages.
Written Opinion for International Application No. PCT/US20/50341 dated Dec. 21, 2020, 7 pages.

\* cited by examiner

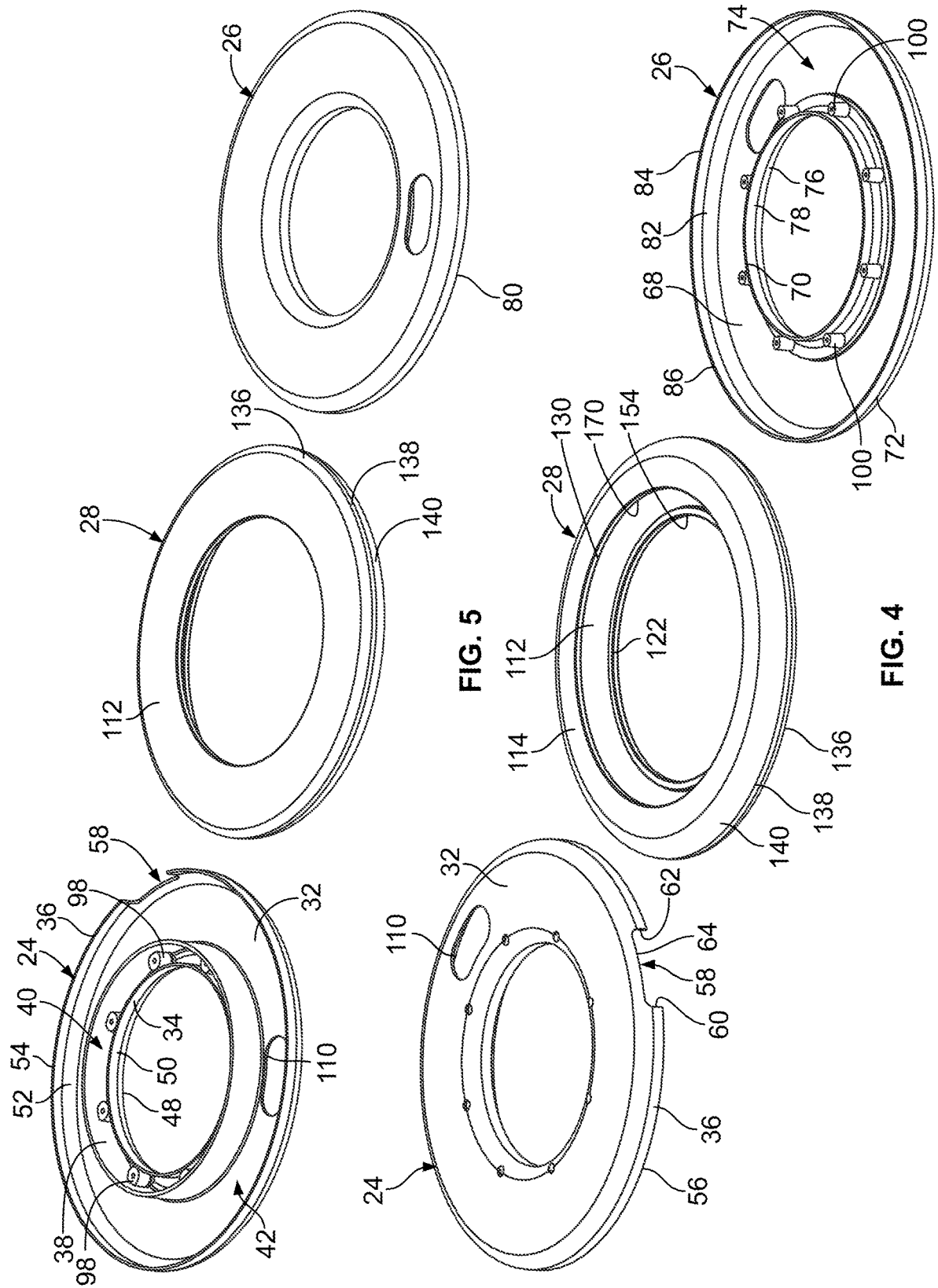

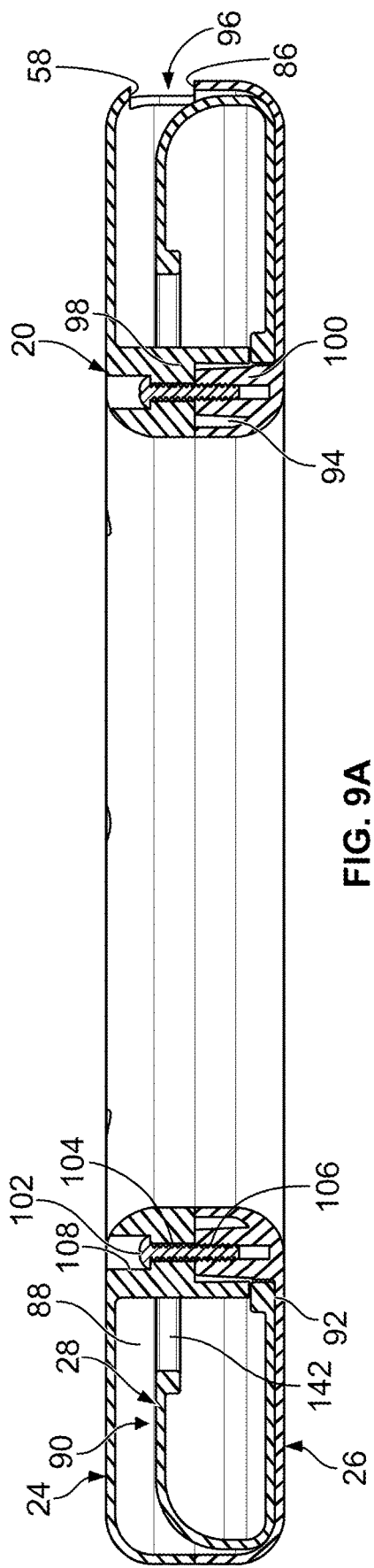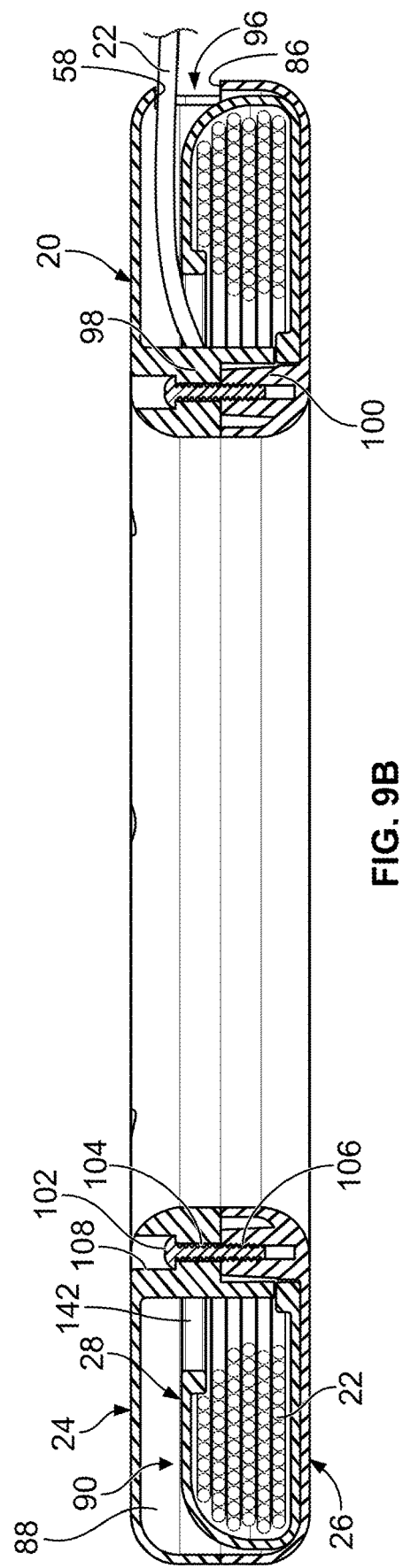

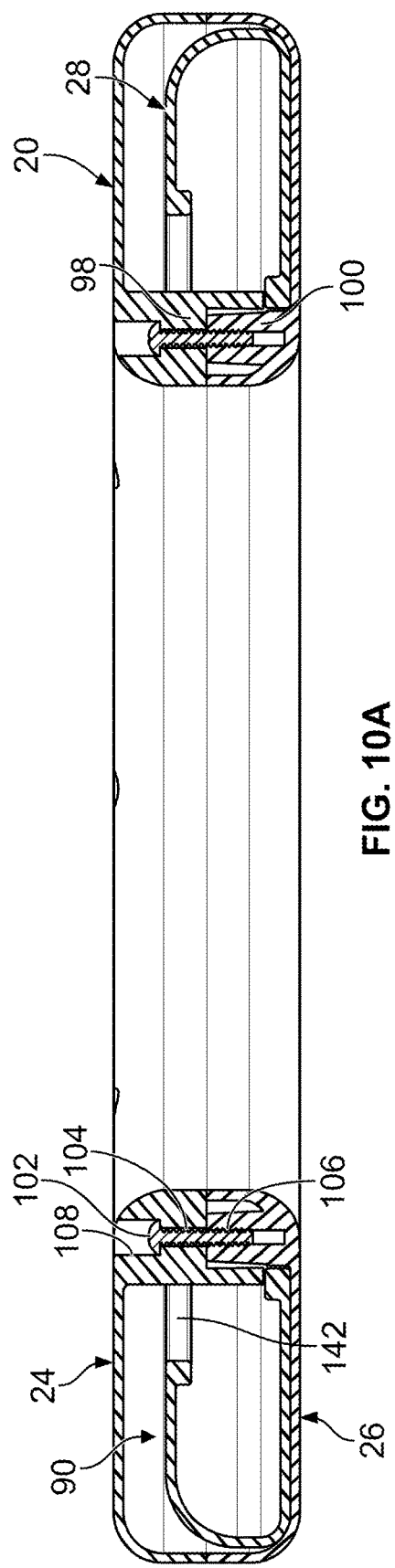
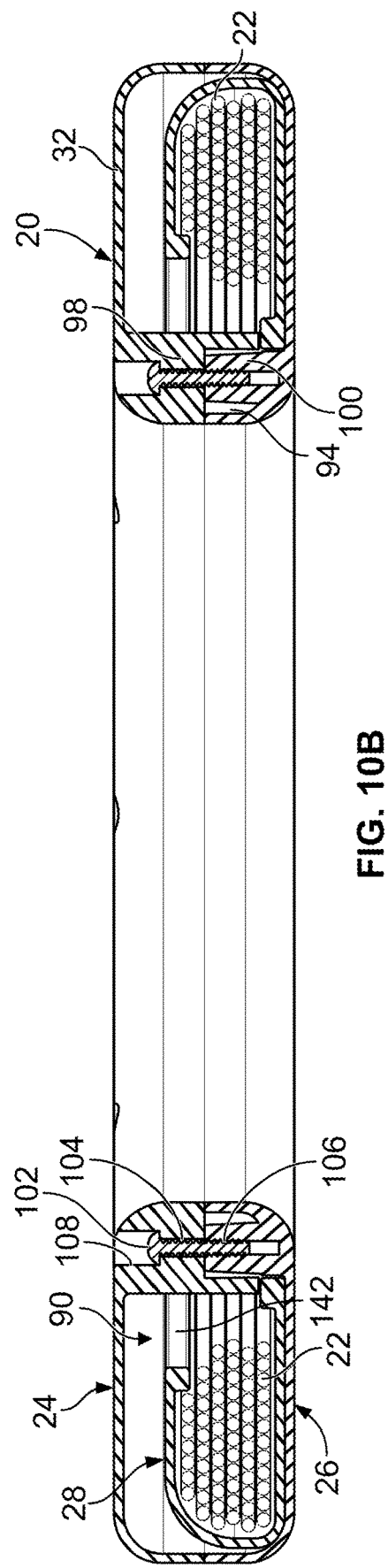
FIG. 10A
FIG. 10B

FISH TAPE CASE, AND FISH TAPE HOUSED THEREIN

RELATED APPLICATIONS

This application is a continuation application of U.S. application Ser. No. 17/440,645 filed on Sep. 17, 2021, which is a 35 U.S.C. 371 application based upon PCT/US2020/032104 filed on May 8, 2020, and claims the domestic priority of U.S. provisional application Ser. No. 62/846,517 filed on May 10, 2019 and U.S. provisional application Ser. No. 62/899,374 filed on Sep. 12, 2019, the contents of which are incorporated herein by reference.

FIELD OF THE DISCLOSURE

The present disclosure relates to an ergonomic fish tape case.

BACKGROUND

There are many different designs for fish tape cases currently on the market. Fish tape cases have a ring-shape with a center aperture. Some prior art fish tape cases feature textured or contoured grips on an inner diameter of their ring-shape. This design encourages users to tray tape in by rotating the case from the inner diameter causing awkward postures for the wrist, notably wrist extension and ulnar deviation. Many prior art fish tape cases also feature a handle; users often misinterpret how to hold these handles and again, end up working in awkward, fatiguing postures.

SUMMARY

A fish tape case is configured to house a fish tape in accordance with some example embodiments is provided. The fish tape includes a shell having a rotatable tray therein. A fish tape extends through openings in the shell and the tray. The fish tape case does not include a handle.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages of various disclosed embodiments will become apparent from the following detailed description taken in conjunction with the accompanying drawings which illustrate, by way of example, the principles of the described embodiments.

BRIEF DESCRIPTION OF THE DRAWINGS

The organization and manner of the structure and operation of the disclosed embodiments, together with further objects and advantages thereof, may best be understood by reference to the following description, taken in connection with the accompanying drawings, which are not necessarily drawn to scale, wherein like reference numerals identify like elements in which:

FIG. 4 depicts an exploded perspective view of the components of the fish tape case, when viewing the fish tape case from the top;

FIG. 5 depicts an exploded perspective view of the components of the fish tape case, when viewing the fish tape case from the bottom;

FIG. 9A depicts a cross-sectional view of the fish tape case;

FIG. 9B depicts the cross-sectional view of the fish tape case of FIG. 9A, but with a fish tape positioned therewithin;

FIG. 10A depicts another cross-sectional view of the fish tape case;

FIG. 10B depicts the cross-sectional view of the fish tape case of FIG. 10A, but with a fish tape positioned therewithin;

DETAILED DESCRIPTION

Figure 1:
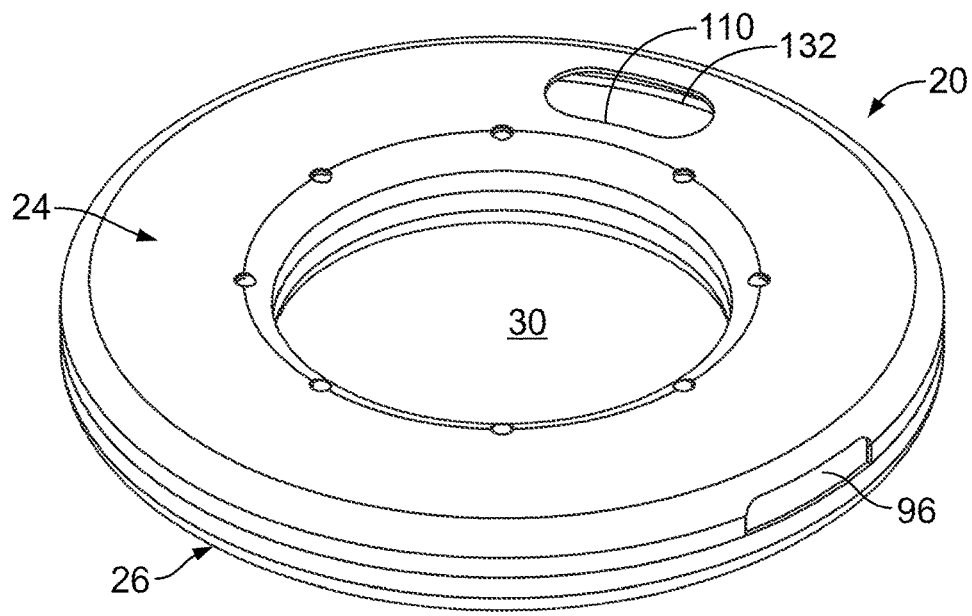
FIG. 1 depicts a perspective view of an embodiment of an ergonomic fish tape case.
Figure 2:
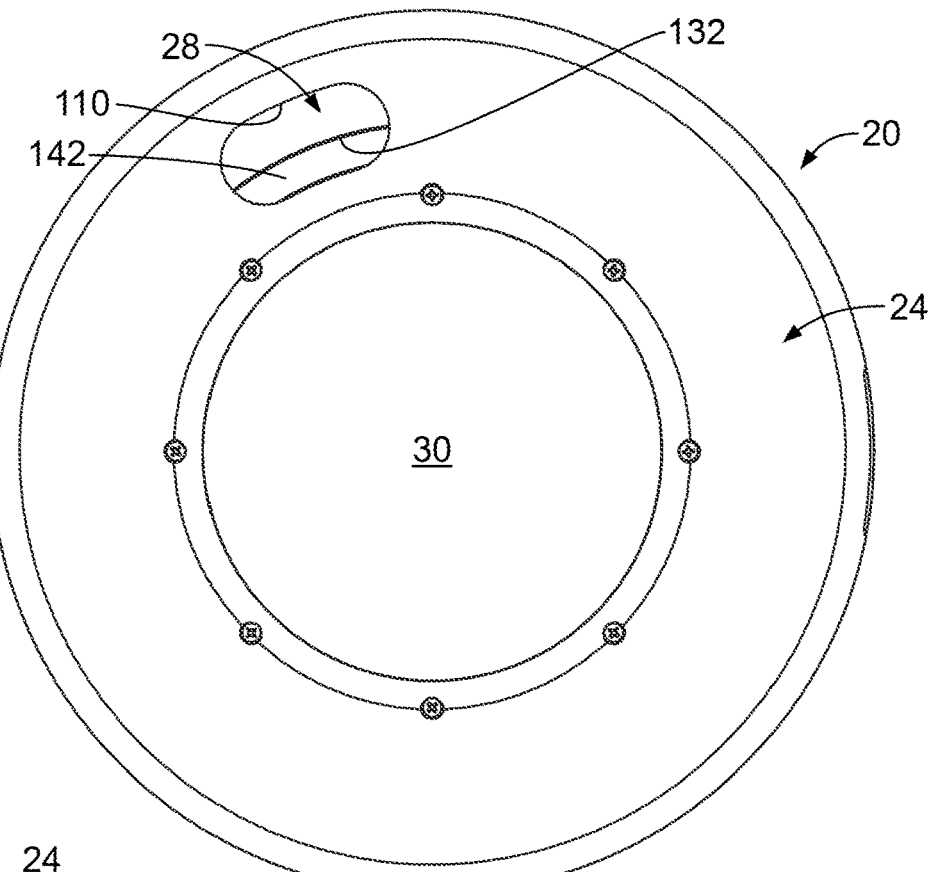
FIG. 2 depicts a top plan view of the fish tape case.
Figure 3:
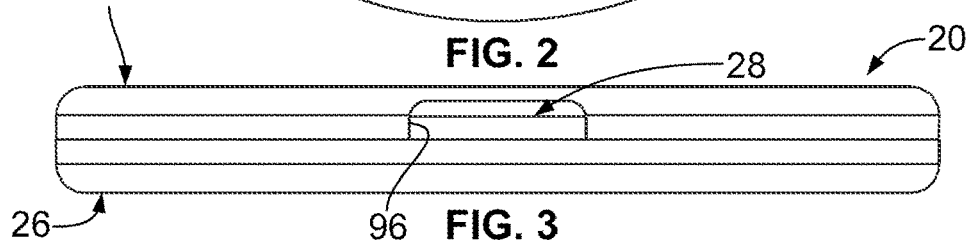
FIG. 3 depicts a side elevation view of the fish tape case.

While the disclosure may be susceptible to embodiment in different forms, there is shown in the drawings, and herein will be described in detail, a specific embodiment with the understanding that the present disclosure is to be considered an exemplification of the principles of the disclosure, and is not intended to limit the disclosure to that as illustrated and described herein. Therefore, unless otherwise noted, features disclosed herein may be combined together to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

An ergonomic fish tape case 20, 220 for dispensing and retracting a fish tape 22 is provided. The fish tape case 20, 220 is described with directional terms, such as upper, lower, upwardly, downwardly and the like which are only used herein for convenience in description and do not denote a required orientation of the fish tape case 20, 220 in use.

Figure 6:
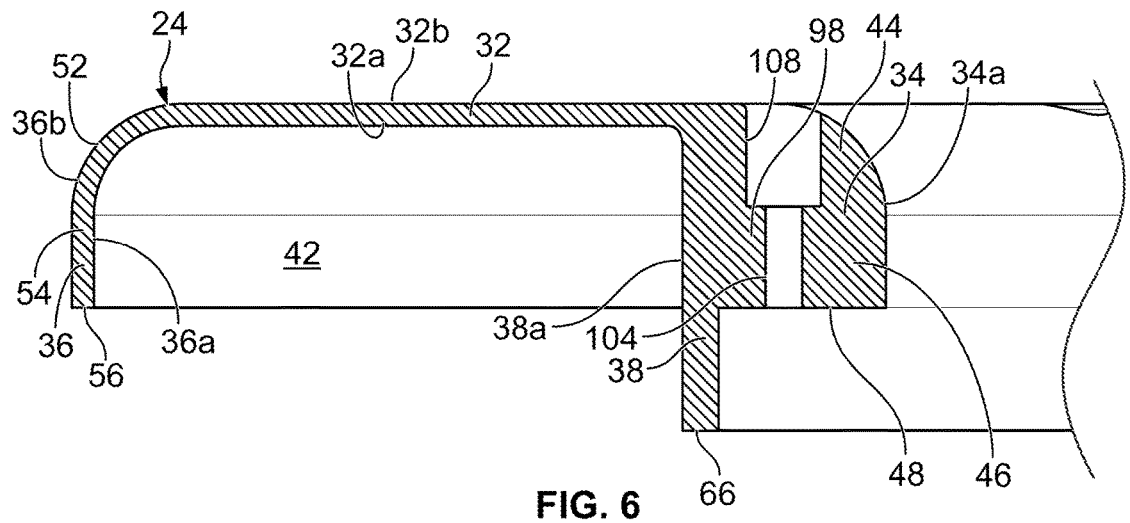
FIG. 6 depicts a partial cross-sectional view of an upper shell part of the fish tape case.
Figure 7:
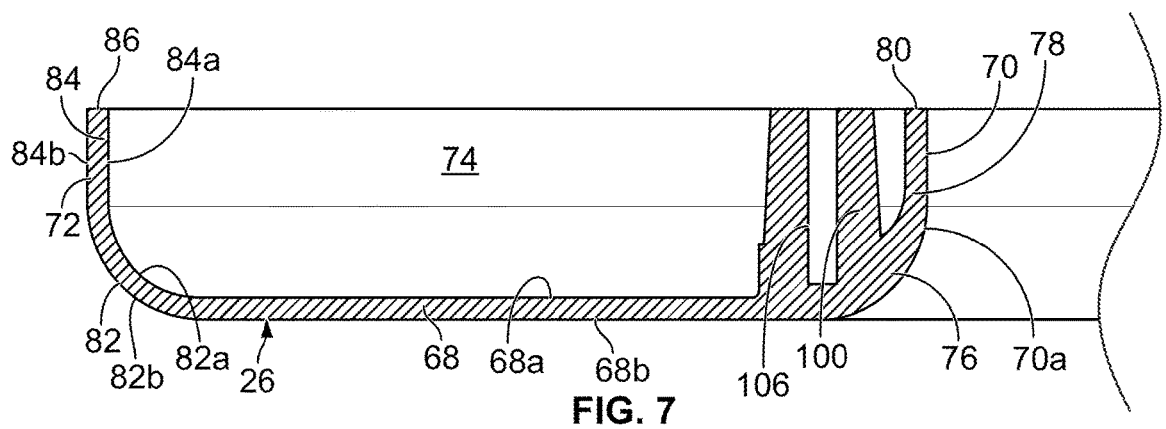
FIG. 7 depicts a partial cross-sectional view of a lower shell part of the fish tape case.
Figure 8:
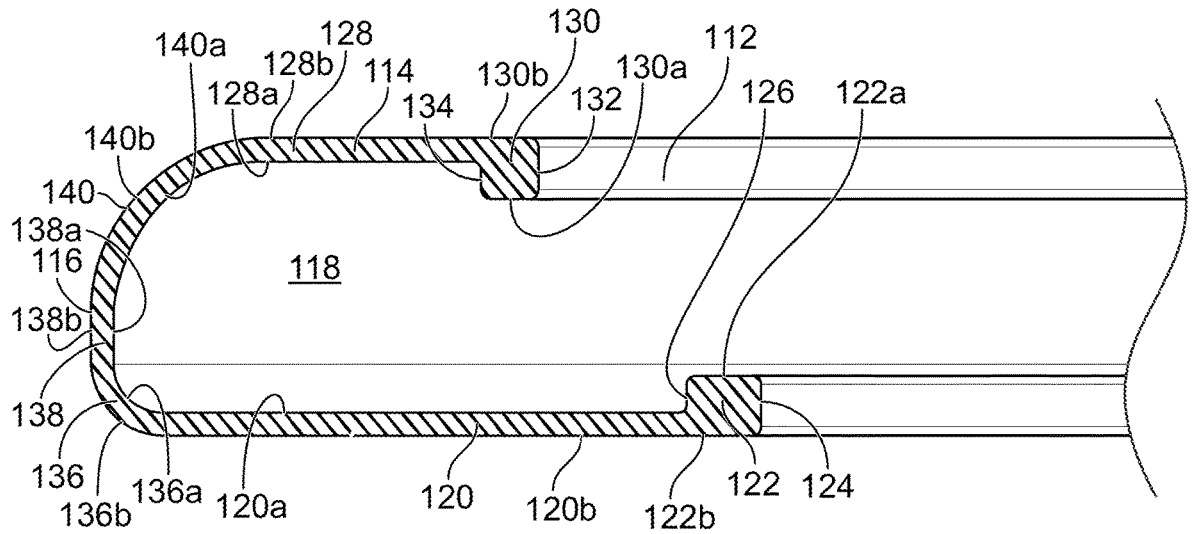
FIG. 8 depicts a partial cross-sectional view of a storage tray of the fish tape case.

The fish tape 22 is conventionally formed and includes a long strip of flexible metal or plastic that has an eye or coupling (not shown) on one of its free ends. The fish tape 22 can have a square, rectangular, or circular cross-section. The fish tape 22 is shown as having a circular cross-section in FIGS. 6B and 7B for the purpose of illustration only. The fish tape 22 can be formed of steel, nylon, plastic, fiberglass, stainless steel, and flexible steel braid. The fish tape 22 may have dimensional markings thereon.

In a first embodiment as shown in FIGS. 1-10B, the ergonomic fish tape case 20 includes mated together shell parts 24, 26 in which the fish tape 22 and a freely rotatable storage tray 28 are mounted. As shown, the fish tape case 20 has two shell parts 24, 26, however, more than two parts can be used to form the fish tape case 20. When mated, the shell parts 24, 26 form a ring shape with a central aperture 30 which defines an inner diameter of the fish tape case 20.

The fish tape 22 is spooled into a coil within the storage tray 28 such that the eye or coupling is on the inner diameter of the coil and an opposite end of the fish tape 22 is on the outer diameter of the coil. The eye or coupling extends outwardly from the storage tray 28 and then outwardly from the mated together shell parts 24, 26.

The shell part 24 includes a circular upper base wall 32, an annularly-shaped inner side wall 34 which depends from an inside peripheral edge of the upper base wall 32, an annularly-shaped outer side wall 36 which depends from an outside peripheral edge of the upper base wall 32, and an annularly-shaped intermediate wall 38 which depends from an inner surface 32a of the upper base wall 32 between the inner side wall 34 and the outer side wall 36. Each wall 34, 36, 38 extends in the same direction and extends completely around the circumference of the upper base wall 32. As such, each wall 34, 36, 38 forms a ring shape.

The upper base wall 32 is planar having inner and outer surfaces 32a, 32b. The inner surface 32a is smooth.

An inner cavity 40 is formed by the inner side wall 34, the intermediate wall 38 and the portion of the upper base wall 32 therebetween. An outer cavity 42 is formed by the outer side wall 36, the intermediate wall 38 and the portion of the upper base wall 32 therebetween.

The inner side wall 34 depends from the inside peripheral edge of the upper base wall 32 and forms a portion of the central aperture 30 when the shell parts 24, 26 are mated together. When viewed in cross-section around the circumference of the inner side wall 34, the inner side wall 34 has a curved section 44 having a first end at the inside peripheral edge of the upper base wall 32 and an opposite second end which connects to a first end of a planar section 46. When viewed in cross-section around the circumference of the outer side wall 36, the planar section 46 is perpendicular to the upper base wall 32 and ends at surface 48. The ends of the curved section 44 and the planar section 46 merge smoothly together.

The outer side wall 36 depends from the outside peripheral edge of the upper base wall 32. When viewed in cross-section around the circumference of the outer side wall 36, the outer side wall 36 has a curved section 52 having a first end at the outside peripheral edge of the upper base wall 32 and an opposite second end which connects to a first end of a planar section 54. When viewed in cross-section around the circumference of the outer side wall 36, the planar section 54 is perpendicular to the upper base wall 32 and ends at surface 56. The ends of the curved section 52 and the planar section 54 merge smoothly together. An inner surface 36a of the outer side wall 36 is smooth.

In an embodiment, the surfaces 48, 56 are coplanar with each other; that is, the inner and outer side walls 34, 36 extend the same distance from the upper base wall 32.

A cutout 58 is provided in the planar section 54 of the outer side wall 36. As shown, the cutout 58 includes a first surface portion 60 which extends from the surface 56 and is generally perpendicular thereto, a second surface portion 62 which extends from the surface 56 and is generally perpendicular thereto and parallel to the first surface portion 60, and an intermediate surface portion 64 which extends from an end of each surface portion 60, 62 and is generally perpendicular to the surface portions 60, 62.

The intermediate wall 38 extends from the inner surface 32a of the upper base wall 32 at the inside peripheral edge and ends at surface 66. When viewed in cross-section around the circumference of the intermediate wall 38, the intermediate wall 38 is planar. A surface 38a of the intermediate wall 38 faces the inner surface 36a of the outer side wall 36. The surface 66 is smooth and, when viewed in cross-section, is planar.

When viewed in cross-section, the planar sections 46, 54 of the inner and outer side walls 34, 36 and the intermediate wall 38 are parallel to each other.

The surface 66 is not aligned with surfaces 48, 56. Surface 66 is spaced at a distance which is further away from the upper base wall 32 than the distances the surfaces 48, 56 are spaced away from the upper base wall 32.

The shell part 26 includes a circular lower base wall 68, an annularly-shaped inner side wall 70 which depends from an inside peripheral edge of the lower base wall 68, and an annularly-shaped outer side wall 72 which depends from an outside peripheral edge of the lower base wall 68. Each side wall 70, 72 extends in the same direction and extends completely around the circumference of the lower base wall 68. As such, each side wall 70, 72 forms a ring shape.

A cavity 74 is formed by the inner side wall 70, the outer side wall 72 and the lower base wall 68 therebetween.

The lower base wall 68 is planar and has inner surface 68a and an outer surface 68b. As shown, the inner surface 68a is smooth and planar.

The inner side wall 70 depends from the inside peripheral edge of the lower base wall 68 and forms a portion of the central aperture 30 when the shell parts 24, 26 are mated together. When viewed in cross-section around the circumference of the inner side wall 70, the inner side wall 70 has a curved section 76 having a first end at the inside peripheral edge of the lower base wall 68 and an opposite second end which connects to a first end of a planar section 78. When viewed in cross-section around the circumference of the outer side wall 72, the planar section 78 is perpendicular to the lower base wall 68 and ends at surface 80. The ends of the curved section 76 and the planar section 78 merge smoothly together.

The outer side wall 72 depends from the outside peripheral edge of the lower base wall 68. When viewed in cross-section around the circumference of the outer side wall 72, the outer side wall 72 has a curved section 82 having a first end at the outside peripheral edge of the lower base wall 68 and an opposite second end which connects to a first end of a planar section 84. When viewed in cross-section around the circumference of the outer side wall 72, the planar section 84 is perpendicular to the lower base wall 68 and ends at surface 86. The curved section 82 has an inner surface 82a and an outer surface 82b. The planar section 84 has an inner surface 84a and an outer surface 84b. The ends of the curved section 82 and the planar section 84 merge smoothly together. The inner surfaces 82a, 84a are smooth.

The surfaces 80, 86 are aligned with each other; that is, the inner and outer side walls 70, 72 extend the same distance from the lower base wall 68. When viewed in cross-section, the planar sections 78, 84 are parallel to each other.

When the shell parts 24, 26 are mated together, the surface 48 of the inner side wall 34 mates with the surface 80 of the inner side wall 70; the surface 56 of the outer side wall 36 mates with the surface 86 of the outer side wall 72. The cavities 42, 74 align with each other to form a first part 88 of a tray receiving space 90, and the surface 66 of the intermediate wall 38 of the shell part 24 is spaced from the inner surface 68a of the lower base wall 68 of the shell part 26 to form a second part 92 of the tray receiving space 90 which is in communication with the first part 88. As such, the tray receiving space 90 is formed by the upper base wall 32, the outer side wall 36, the intermediate wall 38, the lower base wall 68 and the outer side wall 72. A gap 94 is formed between the intermediate wall 38 and the inner side wall 70 that aligns with the inner cavity 40. The cutout 58 aligns with the surface 86 such that an opening which provides a fish tape outlet 96 is formed on an outer diameter of the mated shell parts 24, 26 when the shell parts 24, 26 are mated together through which the fish tape 22 exits from the storage tray 28 when pulled, or enter back through when the fish tape 22 is pushed back into the storage tray 28. The fish tape outlet 96 enables the fish tape 22 to be extracted from a side or outer diameter of the fish tape case 20, as opposed to the face of the fish tape case 20.

In an embodiment, a plurality of spaced apart fastener receiving bosses 98 are provided in the inner cavity 40 of the shell part 24 and a plurality of spaced apart fastener receiving bosses 100 are provided in the gap 94 formed between the shell parts 24, 26. Fasteners 102 are mounted in passageways 104, 106 of the bosses 98, 100 but are seated in countersinks 108 in one of the shell parts 24, 26 (shown in shell part 24 in the drawings). The fasteners 102 may be self-tapping, or the passageways 104, 106 may be threaded for receiving the fasteners 102.

A viewing window 110 may be provided through one or both outside walls 32, 68 and which overlaps the tray receiving space 90. A user can inspect the fish tape 22 within the storage tray 28 by looking through the viewing window 110.

The fish tape case 20 does not include textured or contoured surfaces or grips on the inner diameter of the fish tape case 20 which is defined by the inner side walls 34, 70 of the shell parts 24, 26 defining the central aperture 30 as is commonly provided on prior art fish tape cases. With textured or contoured surfaces or grips on the inner diameter, a user is encouraged to rotate the fish tape case 20 from the inner diameter, thereby causing awkward postures for the user's wrist, which may lead to fatigue. By removing this textured and/or contoured surfaces or grips on the fish tape case 20, the user is less likely to fatigue during the winding of the fish tape 22.

The storage tray 28 is formed from a circular lower base wall 120, a circular upper base wall 114 which are connected together by an annularly-shaped outer side wall 116, and an annularly-shaped inner side wall 122 which extends upwardly from an interior peripheral edge of the lower base wall 120. The inner side wall 122 does not extend upwardly from the lower base wall 120 to the upper base wall 114 such that a space 112 is formed along the interior perimeter of the storage tray 28. The walls 114, 116, 120 generally form a U-shape, and a cavity 118 is formed by the walls 114, 116, 120, 122. The lower and upper base walls 120, 114 are parallel to each other. Each wall 114, 116, 120, 122 extends completely around the circumference of the storage tray 28 such that a ring shape is formed.

The lower base wall 120 has planar inner and outer surfaces 120a, 120b and extends from the outer side wall 116.

The inner side wall 122 forms a shoulder having planar inner and outer surfaces 122a, 122b, and inner and outer side surfaces 124, 126 extending upward from the lower base wall 120. The inner side wall 122 is sized to be received within the second part 92 of the tray receiving space 90. The surfaces 120a, 120b, 122a, 122b, 124, 126 are smooth. The surfaces 120a, 126 form surfaces of the cavity 118.

The upper base wall 114 has a first section 128 which has planar inner and outer surfaces 128a, 128b and which extends from the outer side wall 116, and a second section 130 which has planar inner and outer surfaces 130a, 130b and extends from the first section 128 to an end surface 132. The first section 128 further has an end surface 134 which is opposite to the end surface 132 and which extends from the first section 128 to form a shoulder. As such, the second section 130 is enlarged relative to the first section 128. The inner surface 128a faces the inner surface 120a. The inner surface 130a faces the inner surface 120a. The end surface 132 is offset outwardly from the end surface 124; the end surface 132 is spaced at a distance from the outer side wall 116 which is less than the distance at which the end surface 124 is spaced from the outer side wall 116 and the end surface 134 is spaced at a distance from the outer side wall 116 which is less than the distance at which the end surface 126 is spaced from the outer side wall 116. The surfaces 130a, 130b, 132, 134 are smooth. The surfaces 128a, 134, 130a form surfaces of the cavity 118.

When viewed in cross-section around the circumference of the outer side wall 116, the outer side wall 116 has a first curved section 136 having a first end at an outer peripheral edge of the lower base wall 120 and an opposite second end which connects to a first end of an intermediate section 138 which may be planar or have a radius, and a second curved section 140 having a first end at an outer peripheral edge of the upper base wall 114 and an opposite second end which connects to a second end of the section 138. The first curved section 136 has inner and outer surfaces 136a, 136b which are smooth. The section 138 has inner and outer surfaces 138a, 138b which are smooth. The second curved section 140 has inner and outer surfaces 140a, 140b which are smooth. The surfaces 136a, 138a, 140a form a portion of the cavity 118.

The storage tray 28 seats within the tray receiving space 90 of the mated shell parts 24, 26 to form the fish tape case 20. The inner side wall 122 seats within the second part 92 of the tray receiving space 90 and extends partially into the first part 88 of the tray receiving space 90. Surface 66 and surface 122a face each other and may bear against each other such that surface 120a forms a bearing surface. The lower base wall 120 of the lower base wall 120, the upper base wall 114 and the outer side wall 116 seat within the first part 88 of the tray receiving space 90. The outer surface 138b of the intermediate section 138 of the storage tray 28 is proximate to and may engage against the inner surface 84a of the planar section 84 of the shell part 26. The outer surface 136b of the first curved section 136 of the storage tray 28 seats against the inner surface 82a of the curved section 82 of the shell part 26. The outer surface 120b of the lower base wall 120 and the outer surface 122b of the inner side wall 122 of the 120 of the storage tray 28 may seat against the inner surface 68a of the lower base wall 68 of the shell part 26. The outer surfaces 128b, 130b of the first and second sections 128, 130 of the upper base wall 114 of the storage tray 28 are spaced from the inner surface 32a of the upper base wall 32. The end surface 132 is spaced from the surface 38a of the intermediate wall 38 such that a gap 142 is formed therebetween. The gap 142 aligns with the space 112. As a result, the storage tray 28 is only frictionally engaged with the mated shell parts 24, 26 and is free to spin within the mated shell parts 24, 26. In some embodiments, the smoothness of the surfaces of the shell parts 24, 26 that engage against the surfaces of the storage tray 28 as described herein are interrupted by a friction reducing protrusions (not shown) extending therefrom which are in contact with the surfaces of the storage tray 28. In some embodiments, the smoothness of the surfaces of the storage tray 28 that engage against the surfaces of the shell parts 24, 26 as described herein are interrupted by a friction reducing protrusions (not shown) extending therefrom which are in contact with the surfaces of the shell parts 24, 26.

The fish tape 22 is wound within the storage tray 28 and is positioned in the cavity 118. The shoulder formed by the end surface 126 and the lower base wall 120 and the shoulder formed by end surface 134 and the first section 128 prevent the winds of fish tape 22 from exiting the cavity 118. The fish tape 22 passes through the gap 142, through the tray receiving space 90 above the storage tray 28, and through the fish tape outlet 96. The fish tape 22 can be pulled out of the mated shell parts 24, 26 with the storage tray 28 rotating within the mated shell parts 24, 26. The fish tape 22 can be pushed back into the cavity 118 by user exerting force on the fish tape 22 which causes the storage tray 28 to rotate within the mated shell parts 24, 26 and causes the fish tape 22 to pass back through the fish tape outlet 96, then the gap 142 and then into the cavity 118. By utilizing the storage tray 28 inside a mated shell parts 24, 26, this fish tape case 20 of the present disclosure eliminates a lot of the friction that occurs when trying to tray in and pay out the fish tape 22. This friction is caused by the fish tape 22 coiling tighter in the mated shell parts 24, 26 as the user pulls the fish tape 22 out from the mated shell parts 24, 26 and the fish tape 22 expanding to the mated shell parts 24, 26 outer diameter as the fish tape 22 is trayed back into the mated shell parts 24, 26. The storage tray 28 moves independently of the mated shell parts 24, 26 and rotates as the user pulls the fish tape 22 out or push the fish tape 22 back into the mated shell parts 24, 26. This allows the fish tape 22 to recoil to the same diameter every time by nesting in the storage tray 28. Reducing the force required to tray in and pay out fish tape 22 reduces the amount of strain placed on the user. The storage tray 28 rotates independently of the mated shell parts 24, 26 and prevents the fish tape 22 from contracting towards the intermediate wall 38 of the mated shell parts 24, 26 when the fish tape 22 is being pulled out and prevents the fish tape 22 from expanding towards the outer side walls 36, 72 of the fish tape case 20 when the fish tape 22 is pushed back into the cavity 118. Reducing this friction makes pulling and pushing the fish tape 22 less fatiguing for the user and thus more ergonomic.

In an embodiment, the outer surface 32b of the upper base wall 32, a surface 34a of the inner side wall 34 which forms the portion of the central aperture 30, an outer surface 36b of the outer side wall 36, outer surface 68b of the lower base wall 68, a surface 70a of the inner side wall 70 which forms the portion of the central aperture 30, and the outer surfaces 82b, 84b are planar and smooth, such that they are devoid of surfaces which would indicate or suggest to a user as to how to grip the fish tape case 20.

In a second embodiment as shown in FIGS. 11-22A, the ergonomic fish tape case 220 includes an outer shell 224 in which a freely rotatable storage tray 226 is mounted.

The fish tape 22 is spooled into a coil within the storage tray 226 such that the eye or coupling is on the inner diameter of the coil and an opposite end of the fish tape 22 is on the outer diameter of the coil. The eye or coupling extends outwardly from the storage tray 226 and then outwardly from the outer shell 224.

The outer shell 224 has upper and lower shell parts 240, 242 which are mated together to form a ring shape and form a central aperture 234 which defines an inner diameter of the fish tape case 220. More than two parts can be used to form the outer shell 224.

The upper shell part 240 includes a circular upper base wall 244, an annularly-shaped inner side wall 246 which extends downwardly from an inside peripheral edge of the base wall 244, an annularly-shaped outer side wall 248 which extends downwardly from an outside peripheral edge of the base wall 244, a first annularly-shaped intermediate wall 250 which extends downwardly from an inner surface of the base wall 244 and is spaced radially outwardly from the inner side wall 246, and a second annularly-shaped intermediate wall 252 which extends downwardly from the inner surface of the base wall 244 and is spaced radially outwardly from the first intermediate wall 250. Each wall 246, 248, 250, 252 extends in the same direction, and when viewed in cross-section, the walls 246, 248, 250, 252 are generally parallel to each other. Walls 246, 248, 250 extend completely around the circumference of the base wall 244 and each forms a ring shape. The inner side wall 246 defines an opening 254 through the upper shell part 240. The second intermediate wall 252 extends completely around the circumference of the base wall 244 to form a ring shape. An upper surface of the base wall 244 does not define any obvious means for holding the upper shell part 240.

In an embodiment, the inner side wall 246 is formed by a wall portion 258, and a plurality of ribs 260 extending outwardly therefrom. The outer perimeters of the ribs 260 fall along an imaginary circle and the first intermediate wall 250 extends from the ribs 260.

The first and second intermediate walls 250, 252 have the same vertical height, but have a vertical height which is less than the vertical height of the inner side wall 246. The lower end of the first intermediate wall 250 forms a first bearing surface 262, see FIG. 15, against which the storage tray 226 rides, as described herein.

Figure 13:
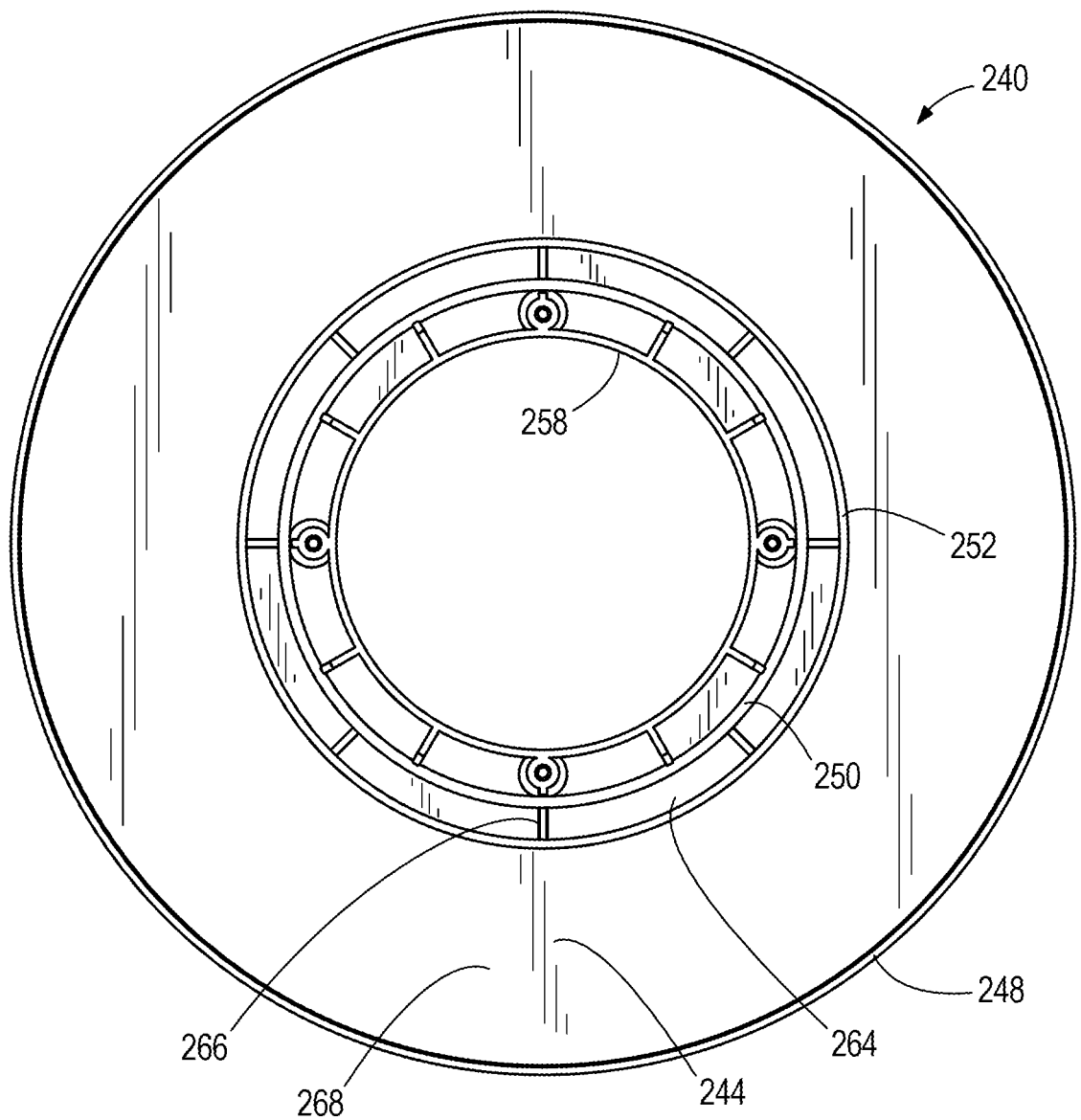
FIG. 13 depicts a bottom plan view of an upper shell part of the fish tape case of FIG. 11.

As shown in FIG. 13, an inner cavity 264 is formed by the first intermediate wall 250, the second intermediate wall 252 and the portion of the base wall 244 therebetween. A plurality of spaced apart ribs 266 may extend downwardly from the inner surface of the base wall 244 in the inner cavity 264 and between the first intermediate wall 250 and the second intermediate wall 252. An outer cavity 268 is formed by the outer side wall 248, the second intermediate wall 252 and the portion of the base wall 244 therebetween.

Figure 11:
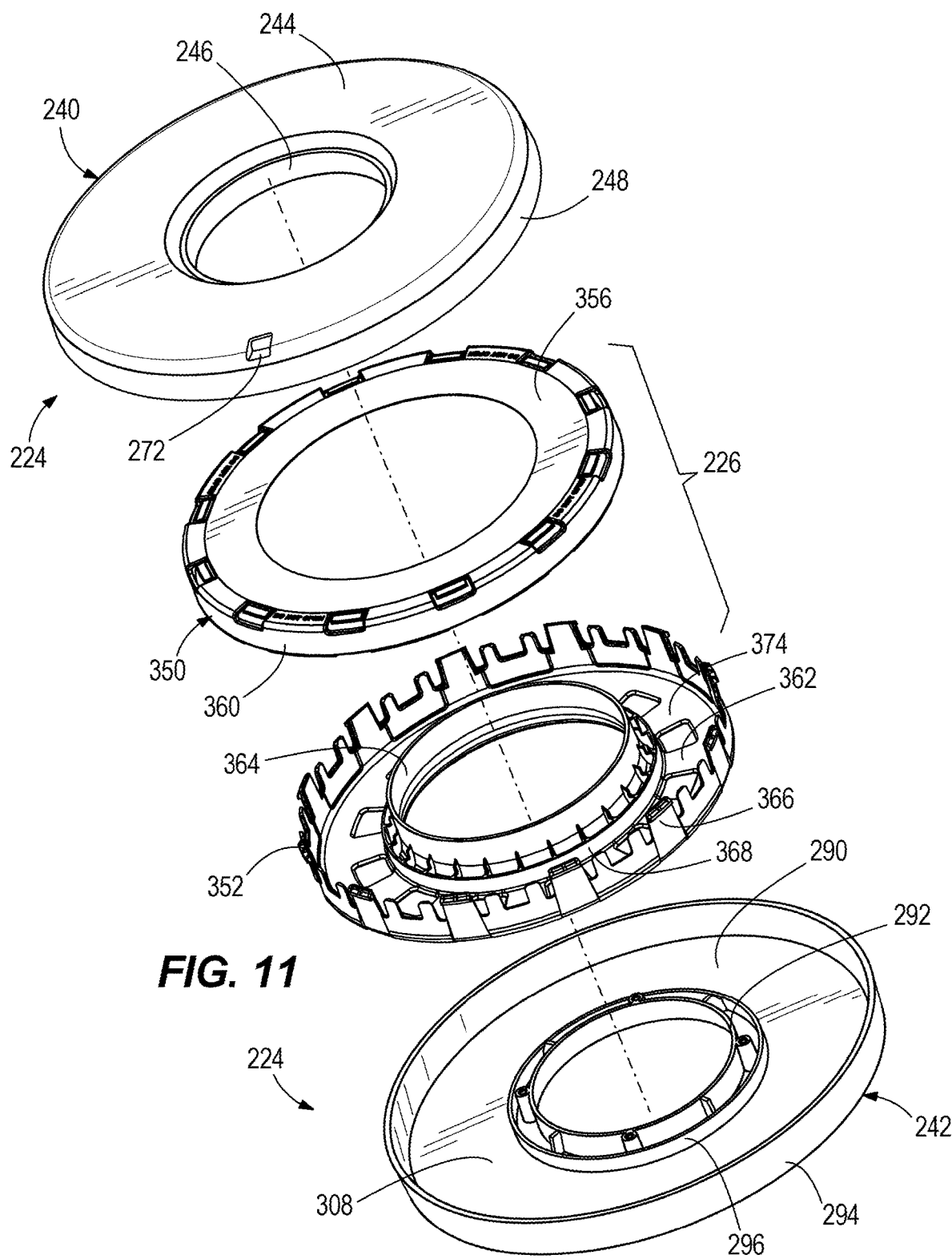
FIG. 11 depicts an exploded perspective view of the components of a second embodiment of the fish tape case, when viewing the fish tape case from the top.
Figure 12:
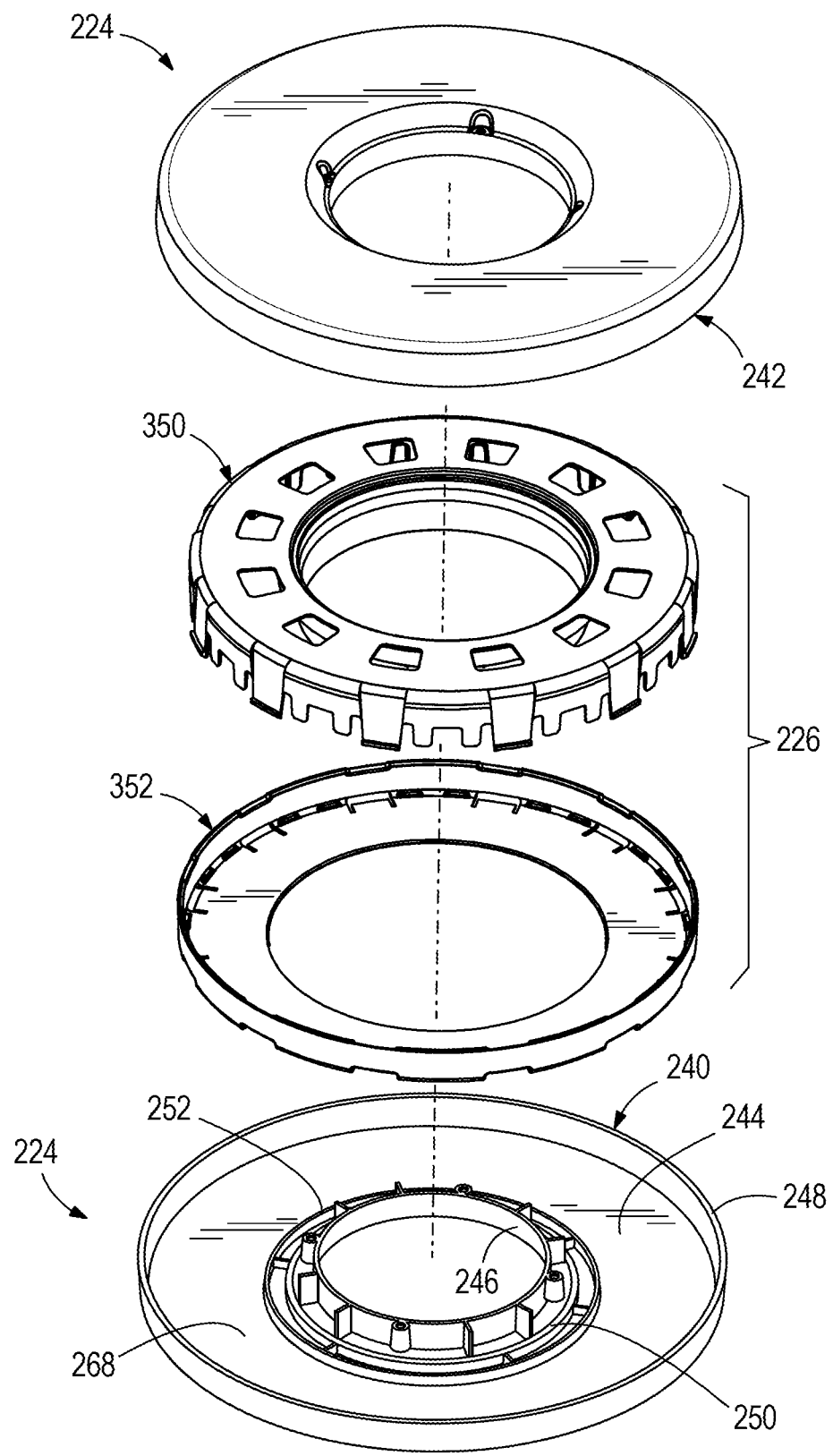
FIG. 12 depicts an exploded perspective view of the components of the fish tape case of FIG. 11, when viewing the fish tape case from the bottom.

An opening which provides a fish tape outlet 272, see FIG. 11, is provided through the outer side wall 248 and is in communication with the outer cavity 268. The fish tape 22 exits the storage tray 226 through the fish tape outlet 272 when pulled, or enters back through when the fish tape 22 is pushed back into the storage tray 226. The fish tape outlet 272 enables the fish tape 22 to be extracted from a side or outer diameter of the fish tape case 220, as opposed to the face of the fish tape case 220.

Figure 14:
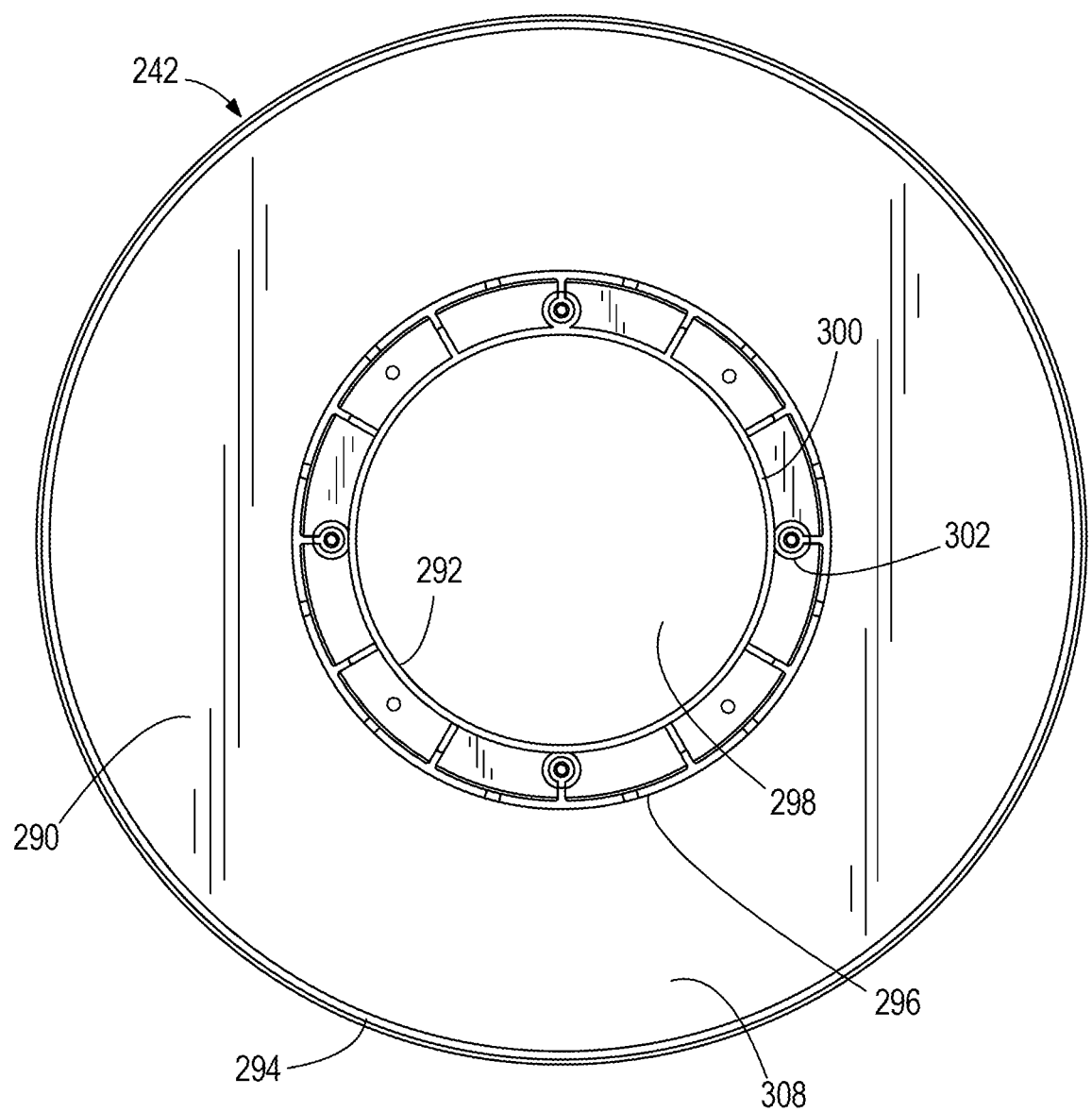
FIG. 14 depicts a top plan view of a lower shell part of the fish tape case of FIG. 11.
Figure 15:
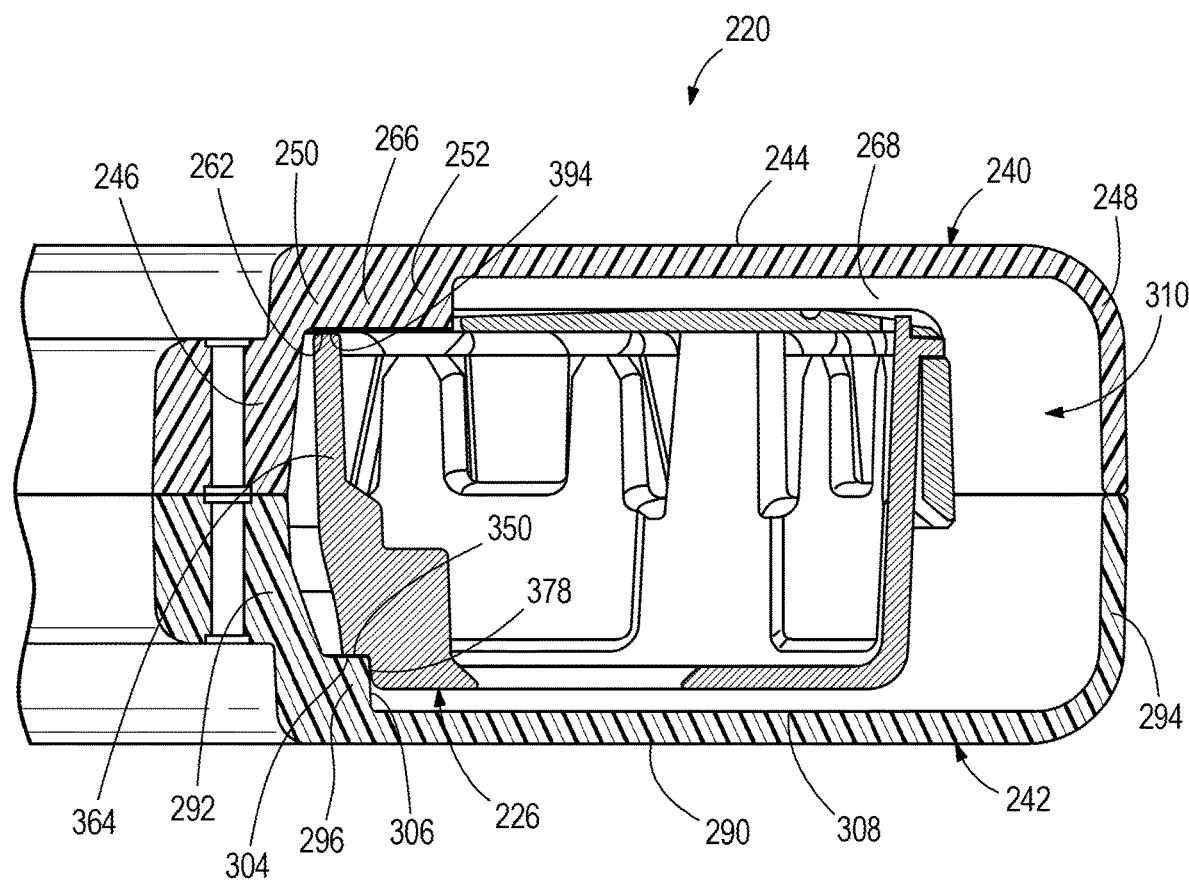
FIG. 15 depicts a partial cross-sectional view of the fish tape case of FIG. 11.
Figure 16:
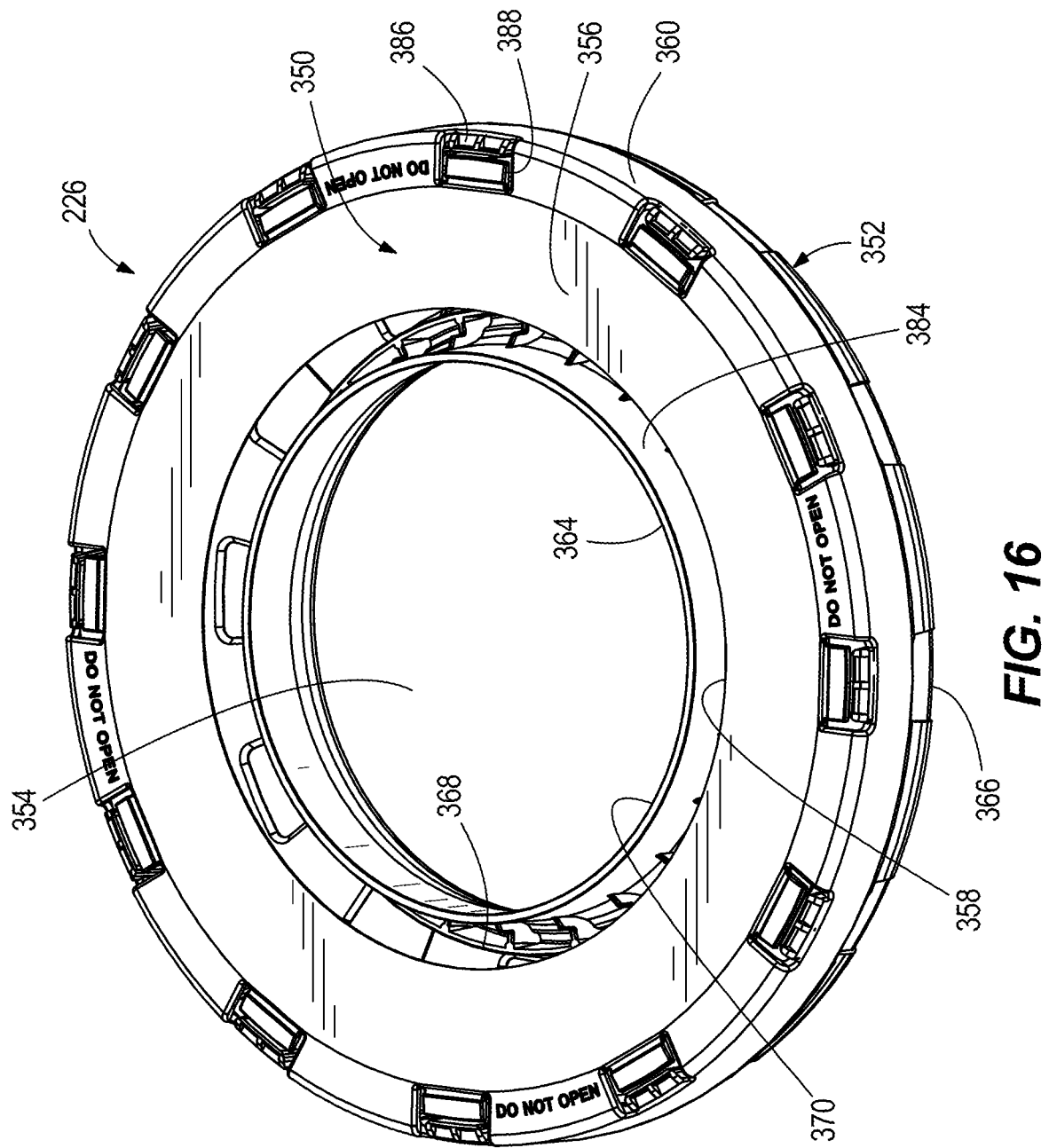
FIG. 16 depicts a perspective view of a storage tray of the fish tape case of FIG. 11.
Figure 17:
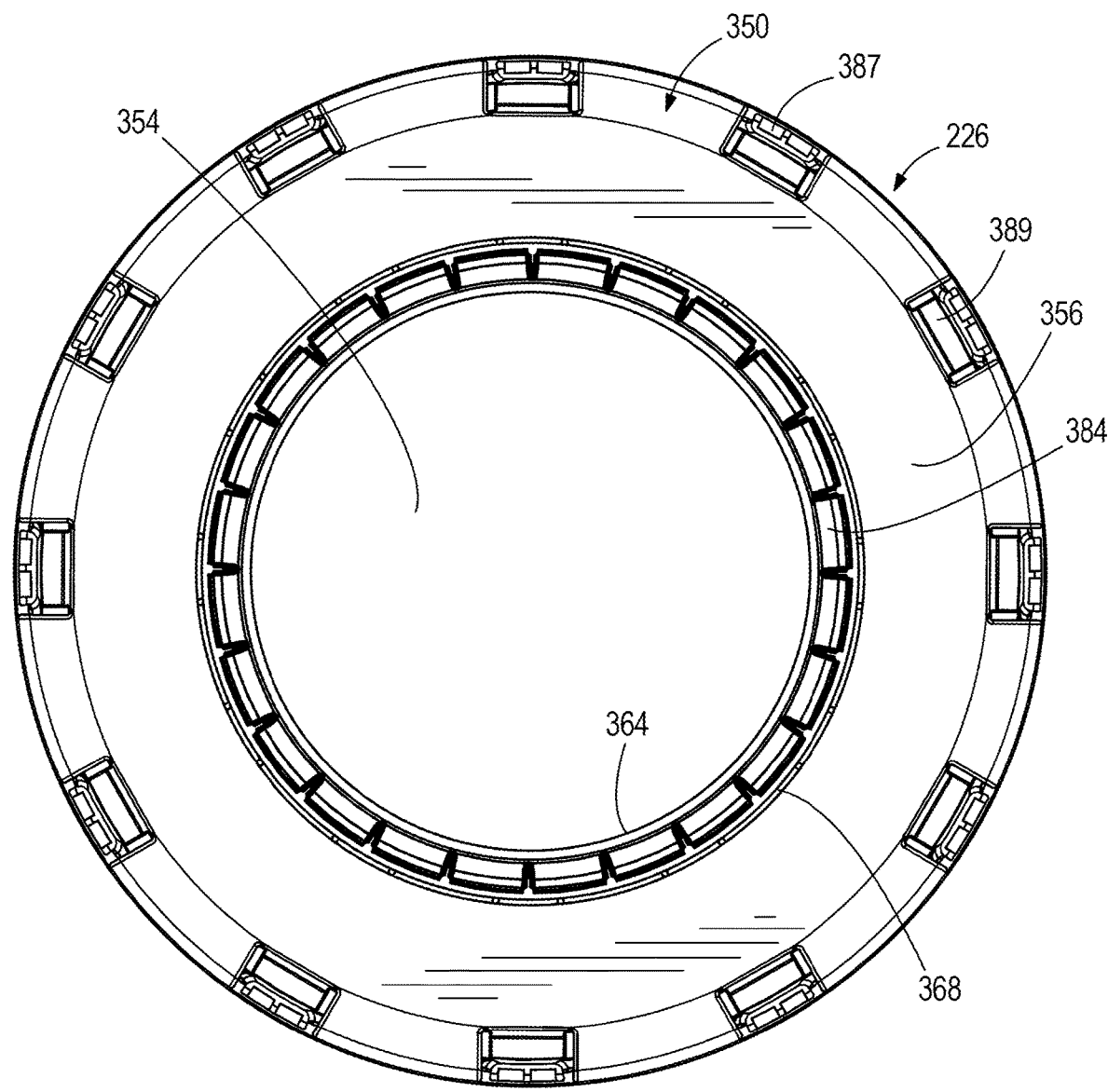
FIG. 17 depicts a top plan view of an upper tray part of the fish tape case of FIG. 11.

As shown in FIG. 14, the lower shell part 242 includes a circular lower base wall 290, an annularly-shaped inner side wall 292 which extends upwardly from an inside peripheral edge of the base wall 290, an annularly-shaped outer side wall 294 which extends upwardly from an outside peripheral edge of the base wall 290, and an annularly-shaped intermediate wall 296 which extends upwardly from an inner surface of the base wall 290 and is spaced radially outwardly from the inner side wall 292. Each wall 292, 294, 296 extends in the same direction, extend completely around the circumference of the base wall 290 to each form a ring shape, and when viewed in cross-section, the walls 292, 294, 296 are generally parallel to each other. The inner side wall 292 defines an opening 298 through the lower shell part 242. A lower surface of the base wall 290 does not define any obvious means for holding the lower shell part 242.

In an embodiment, the inner side wall 292 is formed by a wall portion 300, and a plurality of ribs 302 extending outwardly therefrom. The outer perimeters of the ribs 302 fall along an imaginary circle and the intermediate wall 296 extends from the ribs 302.

The intermediate wall 296 has a vertical height which is less than the vertical height of the inner side wall 292. The upper end of the intermediate wall 296 forms a second bearing surface 304, see FIG. 15, against which the storage tray 226 rides, as described herein, and the outer surface of the intermediate wall 296 forms a third bearing surface 306, see FIG. 15, against which the storage tray 226 rides, as described herein.

A cavity 308 is formed by the outer side wall 294, the intermediate wall 296, and the portion of the base wall 290 therebetween.

The base wall 290 and the inner side wall 292 may be connected together at a curved corner; the base wall 290 and the outer side wall 294 may be connected together at a curved corner.

When the shell parts 240, 242 are mated together, the lower surface of the inner side wall 246 mates with the upper surface of the inner side wall 292, and the outer side walls 248, 294 mate together. The wall portions 258, 300 align with each other and the openings 254, 298 align with each other to form the central opening 234. The cavities 264, 268 in the upper shell part 240 align with the cavity 308 in the lower shell part 242 to form a tray receiving space 310. The first intermediate wall 250 of the upper shell part 240 vertically aligns with the intermediate wall 296, and the bearing surfaces 262, 304 are spaced apart from each other and are generally parallel to each other.

In an embodiment, some of the ribs 260, 302 in the shell parts 240, 242 are fastener receiving bosses in which fasteners (not shown) are mounted in passageways thereof. The fasteners may be seated in countersinks in one of the shell parts 240, 242. The fasteners may be self-tapping, or the passageways may be threaded for receiving the fasteners.

The outer side walls 248, 294 mate together to enclose the storage tray 226 within the outer shell 224.

As shown in FIGS. 16-20, the storage tray 226 has upper and lower tray parts 350, 352 which are mated together to form a ring shape and form a central aperture 354.

Figure 18:
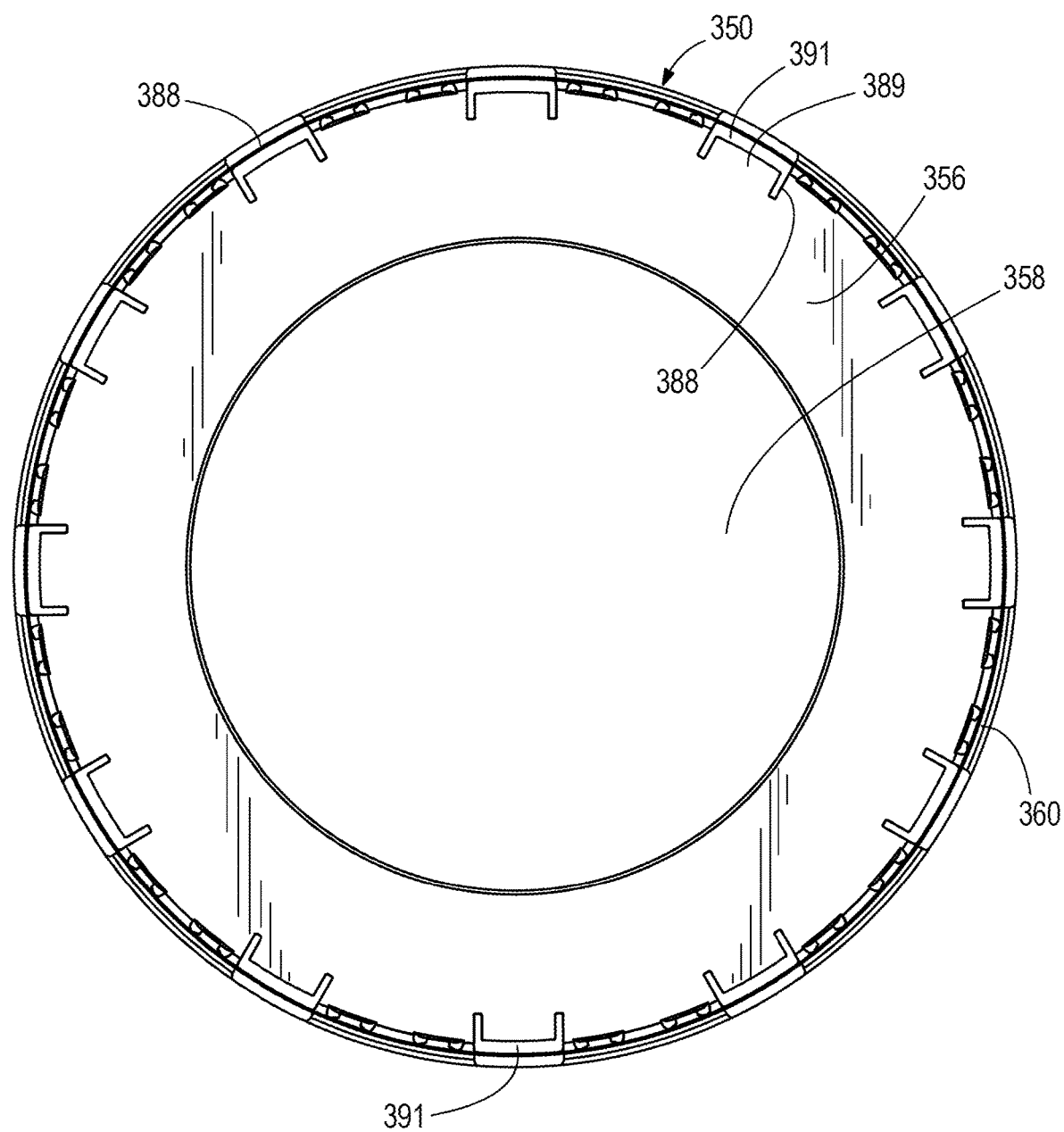
FIG. 18 depicts a bottom plan view of the upper tray part of the fish tape case of FIG. 11.

As shown in FIG. 18, the upper tray part 350 includes a circular upper base wall 356 having a central opening 358 therethrough, and an annularly-shaped outer side wall 360 which extends downwardly from an outside peripheral edge of the base wall 356. The base wall 356 has inner and outer planar surfaces. The outer side wall 360 extends completely around the circumference of the base wall 356 and forms a ring shape.

Figure 19:
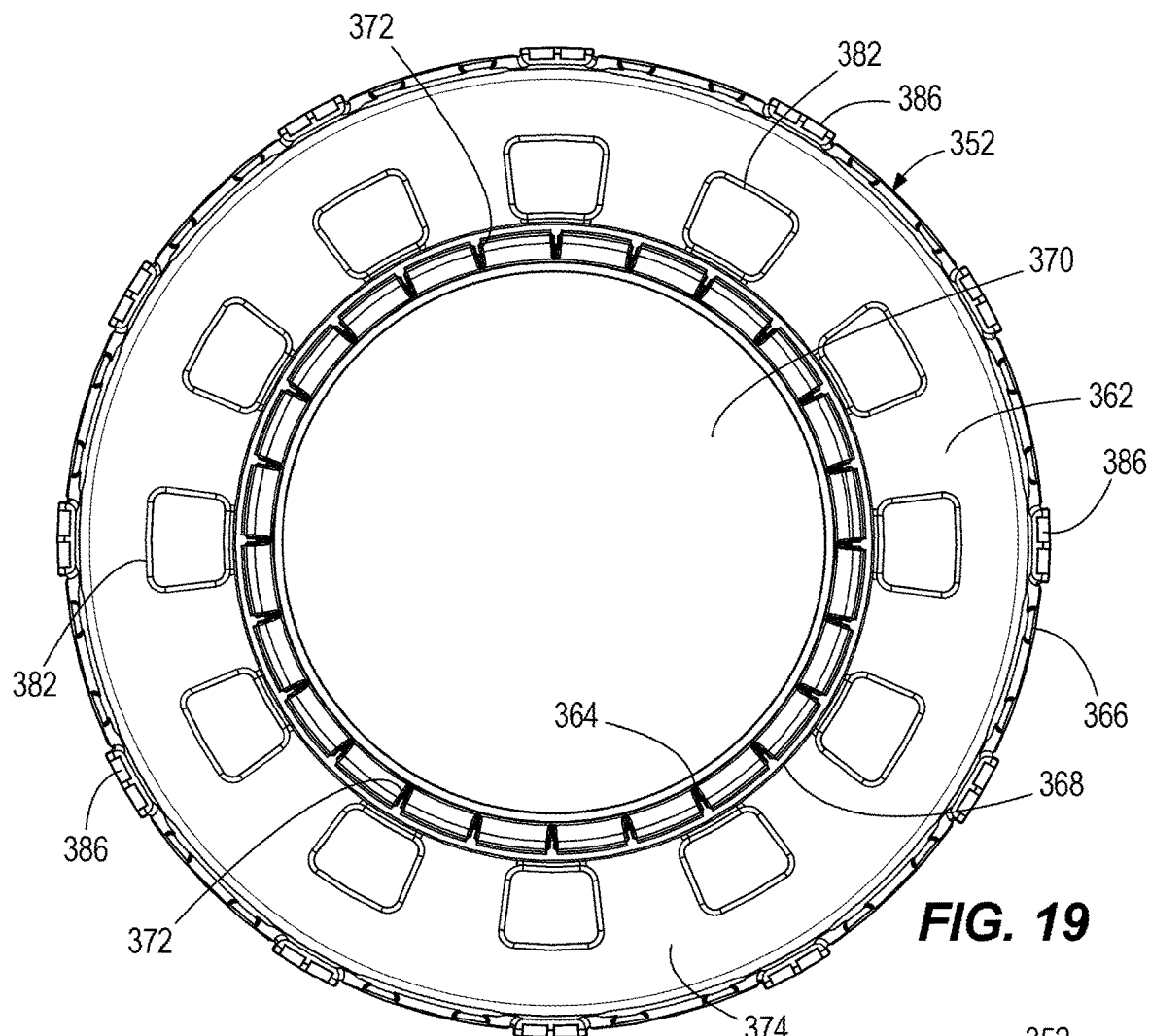
FIG. 19 depicts a bottom plan view of the lower tray part of the fish tape case of FIG. 11.
Figure 20:
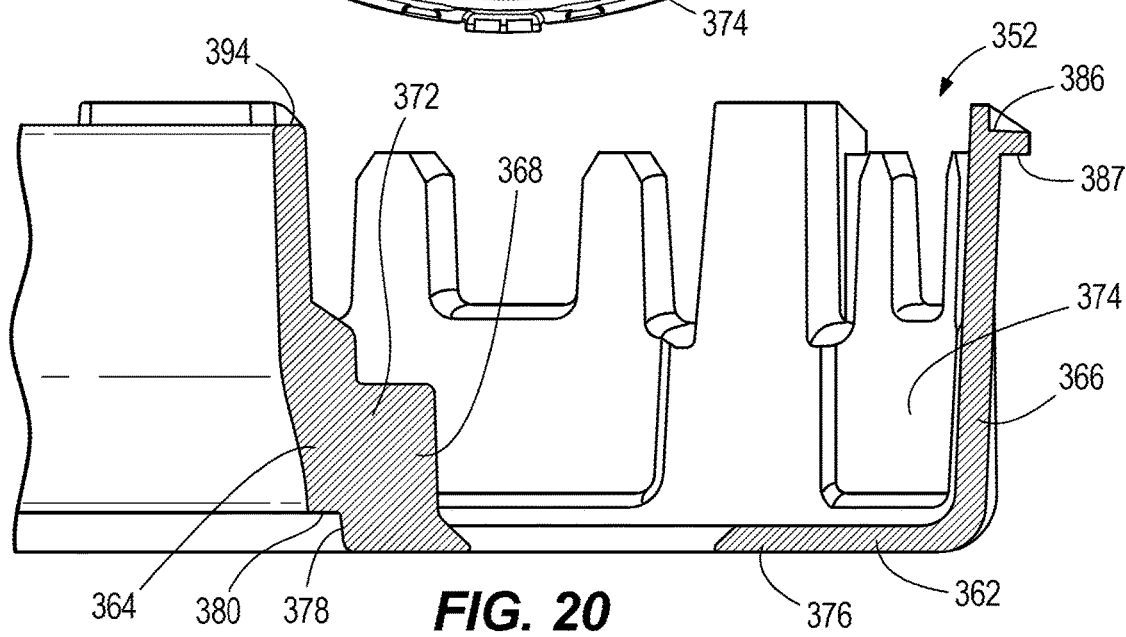
FIG. 20 depicts a partial cross-sectional view of the lower tray part.
Figure 21A:
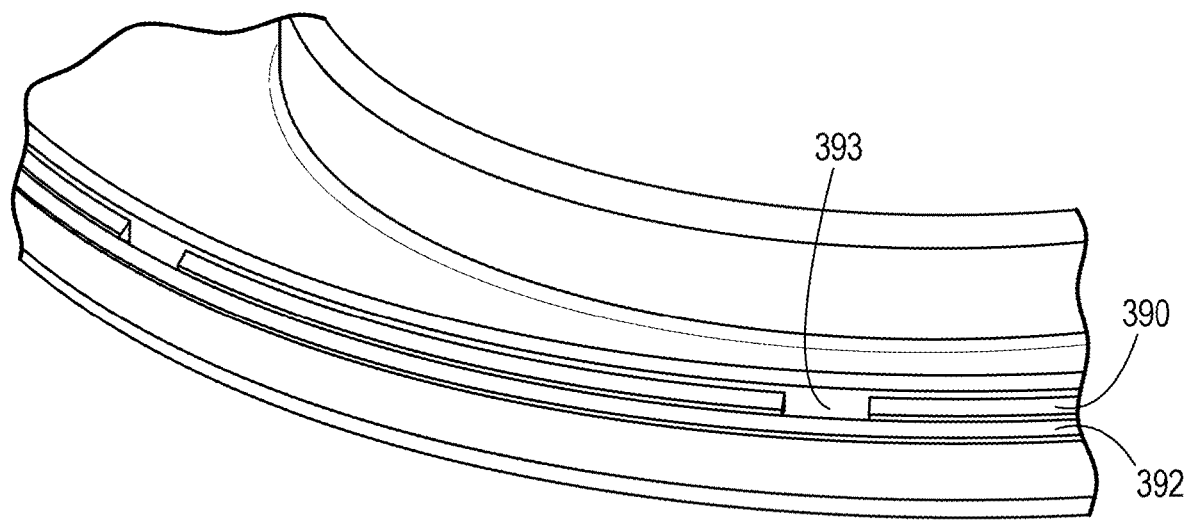
FIGS. 21A-21C depict partial perspective views of an embodiment of the lower tray part.
Figure 21B:
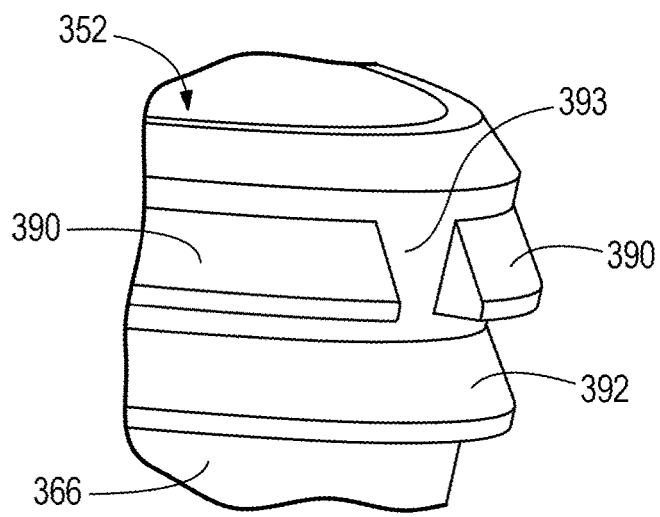
Figure 21C:
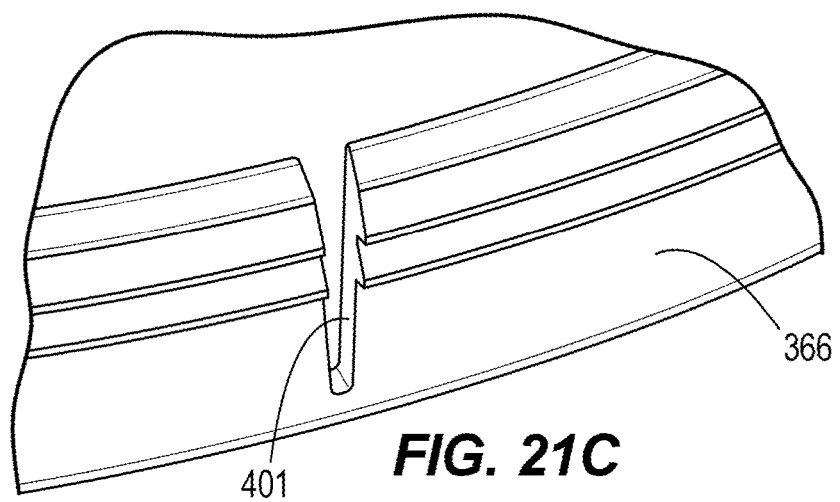
Figure 22A:
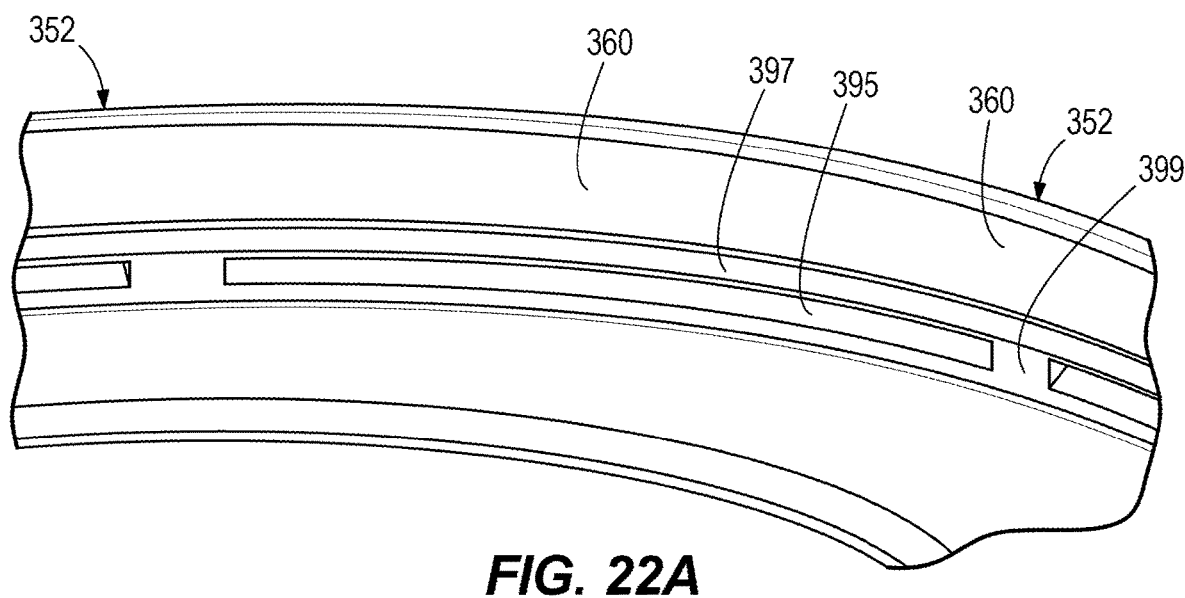
FIGS. 22A-22B depict partial perspective views of an embodiment of the upper tray part.
Figure 22B:
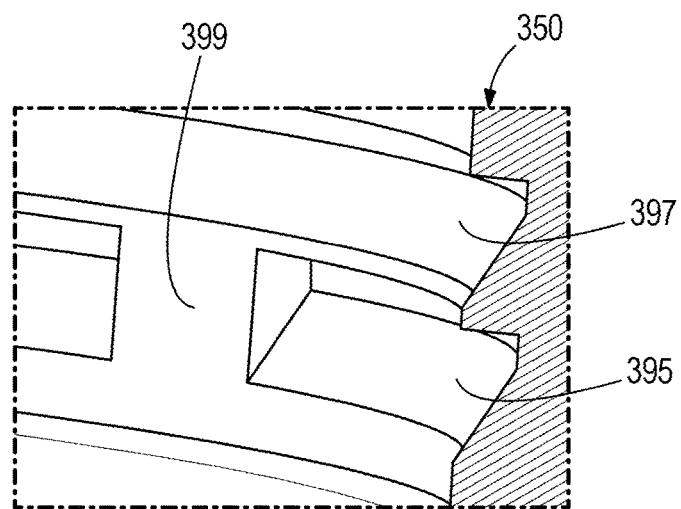

As shown in FIGS. 19 and 20, the lower tray part 352 includes a circular lower base wall 362, an annularly-shaped inner side wall 364 which extends upwardly from an inside peripheral edge of the base wall 362, an annularly-shaped outer side wall 366 which extends upwardly from an outside peripheral edge of the base wall 362, and an annularly-shaped intermediate wall 368 which extends upwardly from an inner surface of the base wall 362 and between the inner side wall 364 and the outer side wall 366. Each wall 364, 366, 368 extends in the same direction and extends completely around the circumference of the base wall 362 to form a ring shape. The inner side wall 364 defines a central opening 370 therethrough. When viewed in cross-section, the walls 364, 366, 368 are generally parallel to each other. A plurality of ribs 372 extend between the inner side wall 364 and the intermediate wall 368. A cavity 374 is formed by the walls 362, 364, 366, 368.

The ends of the inner and outer side walls 364, 366 are generally spaced from the base wall 362 at the same vertical height. The intermediate wall 368 has a vertical height which is substantially less than the heights of the inner and outer side walls 364, 366.

The upper surface of the base wall 362 is planar. The lower surface of the base wall 362 has a first planar surface portion 376 extending inwardly from the outer side wall 366, a second vertical surface portion 378 extending from an inner end of the first planar surface portion 376, and a third horizontal surface portion 380 extending from an upper end of the second vertical surface portion 378 to the inner end of the base wall 362. The second and third surface portions 378, 380 form a step in the lower surface of the base wall 362 directly below the inner side wall 364.

A plurality of openings 382 may be provided in the base wall 362 and extend from the inner surface to the first planar surface portion 376.

The upper and lower tray parts 350, 352 are mated together to entrap the fish tape 22 within the cavity 374 of the lower tray part 352. When mated, the outer side wall 360 of the upper tray part 350 overlaps the outer side wall 366 of the lower tray part 352 such that the inner surface of the outer side wall 360 abuts against the outer surface of the outer side wall 366. The inner side wall 364 of the lower tray part 352 is spaced inwardly from the edge of the base wall 356 which forms the opening 358 of the upper tray part 350 such that a space 384 is formed therebetween when the storage tray 226 is viewed from above. The space 384 is in communication with the cavity 374. When viewed from above the storage tray 226, the intermediate wall 368 can be seen through the space 384. The fish tape 22 is wound within the outer side wall 366 of the lower tray part 352, and spooled within the cavity 374. The eye or coupling is proximate to the inner side wall 364. The eye or coupling of the fish tape 22 and a portion of a body of the fish tape 22 are passed through the space 384 and extended outwardly of the storage tray 226. As such, the fish tape 22 exits the storage tray 226 along its face near the inner diameter.

The outer side walls 360, 366 have latching structure thereon which are used to connect the upper and lower tray parts 350, 352 together.

In an embodiment as shown in FIGS. 16-20, the lower tray part 352 has a plurality of flexible latch arms 386, each having a barb 387 on the free end thereof, extending upwardly from the outer side wall 366 and the upper tray part 350 has a plurality of openings 388 through the upper base wall 356. The upper base wall 356 further has a tab 389 extending into each opening 388 to define a smaller receiving opening 391 between the end of the tab 389 and the outer side wall 360 into which the barbed end of the respective latch arms 386 seats. When the upper and lower tray parts 350, 352 are mated together, the barbs 387 on the latch arms 386 slide along the inner surface of the outer side wall 360 and the latch arms 386 are flexed inwardly toward the center of the lower tray part 352. The barbs 387 on the latch arms 386 engage the underside of the tabs 389 and bias the tabs 389 upwardly. Once the barbs 387 pass by the tabs 389, the tabs 389 engage the opposite surfaces of the latch arms 386. Once the barbs 387 pass through the receiving openings 391, the latch arms 386 are biased outward by the tabs 389 and the barbs 387 engage with the upper end of the outer side wall 360 forming the respective opening 388, thereby causing a "snap-fit" of the upper and lower tray parts 350, 352 together. The tabs 389 add strength to the assembly of the upper and lower tray parts 350, 352. The upper and lower tray parts 350, 352 can be separated from each other by pulling the tabs 389 on the upper tray part 350 upward which causes the latch arms 386 to flex inward toward the center of the upper tray part 350. This action releases the barbs 387 from engagement with the upper end of the outer side wall 360. When the lower tray part 352 is then pulled away from the upper tray part 350, the barbs 287 pass through the openings 388 and engage with and slide along the inner surface of the outer side wall 360. While these figures show the lower tray part 352 having the flexible latch arms 386 and the upper tray part 350 having the openings 388, the flexible latch arms and latch arms can be reversed such that the lower tray part 352 has the openings and the upper tray part 350 has the flexible latch arms.

In another embodiment as shown in FIGS. 21A-22B, proximate to an upper end of the outer side wall 366 of the lower tray part 352, the outer side wall 366 has a plurality of upper barbs 390 extending outwardly therefrom and a lower barb 392 extending outwardly therefrom. The upper barbs 390 extend circumferentially around the outer circumference of the outer side wall 366 and are spaced apart from each other by portions 393 of the outer side wall 366. The lower barb 392 extends circumferentially and continuously from the outer side wall 366 around its outer circumference. Proximate to a lower end of the outer side wall 360 of the upper tray part 350, the outer side wall 360 has a plurality of lower mating recesses 395 in which the upper barbs 390 on the lower tray part 352 can seat within and an upper mating recess 397 in which the lower barb 392 on the lower tray part 352 can seat within. The lower mating recesses 395 extend circumferentially around the outer circumference of the outer side wall 366 and are spaced apart from each other by portions 399 of the outer side wall 360. The upper mating recess 397 extends circumferentially and continuously from the outer side wall 360 around its outer circumference. When the upper and lower tray parts 350, 352 are secured together, the upper barbs 390 seat within the lower mating recesses 395 and the lower barb 392 seats within the upper mating recess 397. The portions 399 of the outer side wall 360 abut against the portions 393 of the outer side wall 366. As a result, the upper and lower tray parts 350, 352 cannot rotate relative to each other. The outer side wall 366 of the lower tray part 352 has a plurality of breaks 401 which extend from the top end of the outer side wall 366 to the bottom end of the outer side wall 366 and which divides the outer side wall 366 into portions. This assists in the flexing of the lower tray part 352 when inserted into the upper tray part 350. While these figures show the lower tray part 352 having the barbs 390 and the barb 392 and the upper tray part 350 having the recesses 395, 297, the barbs and recesses can be reversed such that the lower tray part 352 has the recesses and the upper tray part 350 has the barbs.

The latching structure may include a living hinge to maintain the upper and lower tray parts 350, 352 together at all times. Other latching structure are within the scope of the present disclosure, such as, for example, fasteners and adhesives.

The upper shell part 240 is assembled with the eye or coupling of the fish tape 22. The eye or coupling and a portion of the body of the fish tape 22 extend from through the space 384 along the inner diameter of the storage tray 226, through the outer cavity 268 of the upper shell 240 and through the fish tape outlet 272. Thereafter, the upper and lower shell parts 240, 242 are assembled with each other with the storage tray 226 within the tray receiving space 310. When inserted, the central aperture 354 of the storage tray 226 encircles the intermediate wall 296 such that the third horizontal surface portion 380 of the base wall 362 of the storage tray 226 seats on the second bearing surface 304 of the lower shell part 242 and second vertical surface portion 378 of the base wall 362 of the storage tray 226 engages against third bearing surface 306 of the lower shell part 242. The upper end 394 of the inner side wall 364 engages with the first bearing surface 262 of the upper shell part 240 such that the storage tray 226 is trapped between the bearings surfaces 262, 304, 306.

The fish tape 22 can be easily pulled out of the fish tape case 220 by the user simply grasping the eye or coupling and/or by the gripping the body of the fish tape 22 and pulling. The storage tray 226 freely spins within the shell 224 with only contact between the bearing surfaces 262 and the upper end 394 of the inner side wall 364, the bearing surface 304 and the third horizontal surface portion 380, and the bearing surface 306 and the second vertical surface portion 378. As shown, the bearing surface 304 is wavy, which reduces the contact area with the third horizontal surface portion 380 of the storage tray 226, however, the bearing surface 304 may be planar. The bearing surface 262 may also be wavy to reduce the contact area with the upper end 394 of the inner side wall 364.

The fish tape 22 can be easily pushed back into the fish tape case 220 by user exerting force on the fish tape 22 which causes the storage tray 226 to rotate within the shell 224. The fish tape 22 is push wound about the outer diameter of the coil of the fish tape 22.

When the fish tape 22 is pushed back into the fish tape case 220, the shoulder 282a or 284a engages the eye or coupling and prevents the eye or coupling from moving past the shoulder 282a or 284a and into the inner section 280 of the recess 274. The eye or coupling is at least partially recessed into the shell part 240 when positioned against the shoulder 282a or 284a. This serves to protect the eye or coupling during transport.

The storage tray 226 moves independently of the shell 224 and rotates as the user pulls the fish tape 22 out or pushes the fish tape 22 back into the shell 224. This allows the fish tape 22 to recoil to the same diameter every time by nesting in the storage tray 226. Reducing the force required to tray in and pay out fish tape 22 reduces the amount of strain placed on the user. By utilizing the storage tray 226 inside the shell, this fish tape case 220 of the present disclosure eliminates a lot of the friction that occurs when trying to tray in and pay out the fish tape 22.

The bearing surfaces 262, 304, 306 provide for very low friction between the shell 224 and the storage tray 226 such that the storage tray 226 spins substantially freely within the shell 224. In addition, the bearing surfaces 262, 304, 306 allow for the fish tape case 220 to be oriented in any direction and have the storage tray 226 still freely spinning.

For example, the fish tape case 220 can be positioned with its lower shell part 242 on a horizontal surface, its upper shell part 240 on the horizontal surface, in a vertical orientation, or at any angle therebetween. Reducing the friction makes pulling and pushing the fish tape 22 less fatiguing for the user and thus more ergonomic.

The provision of the fish tape outlet 96, 272 on outer diameter of the fish tape case 20, 220 allows the fish tape case 20, 220 to be used equally well by both left-handed and right-handed users. No user has to reach around a front of the fish tape case 20, 220 to access the fish tape outlet 96, 272. In addition, when the fish tape outlet 96, 272 is used, the user can easily switch from holding the fish tape case 20, 220 in his/her right hand to his/her left hand without having to rotate the fish tape case 20, 220. This can be done even in an instance where a large quantity of fish tape 22 has been fed out of the fish tape case 20, 220 since the fish tape 22 will not be twisted when the user switches hands. This provides another ergonomic feature of the fish tape case 20, 220.

The fish tape case 20, 220 does not include a handle as is commonly provided on prior art fish tape cases. With a handle, a user may misinterpret how to hold the fish tape case 20, 220, and work in an awkward, fatiguing posture. The rigidity of the fish tape case 20, 220 and the lifetime of the fish tape case 20, 220 is improved without a handle, since the handle is the component that typically wears out first. Without a handle, users are encouraged to hold the bulk of the weight of the fish tape case 20, 220 in their power zone, close to their center of mass. Without a handle, it is more natural to place one hand on the outer diameter of the shell 224 and rest most of the weight of the fish tape case 20, 220 on their hip, cradling the fish tape case 20, 220 between their arm and body. This reduces unnecessary muscle activation and potential fatigue. Furthermore, the removal of the handle reduces the overall footprint of the fish tape case 20, 220 which reduces the cost of shipping by saving box space.

Many modifications and other embodiments of the disclosure set forth herein will come to mind to one skilled in the art to which these disclosed embodiments pertain having the benefit of the teachings presented in the foregoing descriptions and the associated drawings. Therefore, it is to be understood that the disclosure is not to be limited to the specific embodiments disclosed herein and that modifications and other embodiments are intended to be included within the scope of the disclosure. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

What is claimed is:

1. A fish tape case configured to house a fish tape comprising:
    a shell including
        an upper shell part including an upper base wall, an inner side wall extending from an inner perimeter of the upper base wall, an outer side wall extending from an outer perimeter of the upper base wall,
        a lower shell part including a lower base wall, an inner side wall extending from an inner perimeter of the lower base wall, an outer side wall extending from an outer perimeter of the lower base wall,
        wherein the inner side walls mate together and form a central aperture, and the outer side walls mate together and define an outer diameter, and a cavity is formed by the walls, and
        the upper shell part having an opening therethrough in communication with the cavity; and
    a storage tray including an upper base wall, a lower base wall, an inner side wall extending from an inner perimeter of the lower base wall of the storage tray, an outer side wall extending between outer perimeters of the base walls of the storage tray and defining an outer diameter of the storage tray, the walls of the storage tray defining a cavity therein, the storage tray having an opening therethrough which is in communication with the cavity and through which the fish tape can pass.

2. The fish tape case of claim 1, wherein the upper and lower shell parts are in a mated condition to form the cavity of the shell and can be separated into a separated condition to expose the storage tray therein, and wherein a first storage tray housing a first fish tape can be positioned within the cavity of the shell when the shell is in the separated position or a second storage tray housing a second fish tape can be positioned within the cavity of the shell when the shell is in the separated position.

3. The fish tape case of claim 2, wherein the first fish tape is formed of steel and the second fish tape is formed of fiberglass.

4. The fish tape case of claim 2, wherein the first fish tape is formed of steel and the second fish tape is formed of plastic.

5. The fish tape case of claim 2, wherein the shell has a viewing window provided therethrough to allow a visual inspection of the fish tape.

6. The fish tape case of claim 2, wherein the fish tape is spooled into a coil within the cavity of the storage tray, and has a coupling on an inner diameter of the coil and an opposite end of the fish tape is on an outer diameter of the coil.

7. The fish tape case of claim 1,
    wherein the upper and lower shell parts are in a mated condition to form the cavity of the shell and can be separated into a separated condition to expose the storage tray therein, and
    wherein the storage tray is formed of an upper tray part and a lower tray part which are in a mated condition to form the cavity of the storage tray and can be separated into a separated condition to expose a fish tape therein, and wherein a first fish tape can be positioned within the cavity of the storage tray when the storage tray is in the open position or a second different fish tape can be positioned within the cavity of the storage tray when the storage tray is in the open position.

8. The fish tape case of claim 7, wherein the first fish tape is formed of steel and the second fish tape is formed of fiberglass.

9. The fish tape case of claim 7, wherein the first fish tape is formed of steel and the second fish tape is formed of plastic.

10. The fish tape case of claim 7, wherein the shell has a viewing window provided therethrough to allow a visual inspection of the fish tape.

11. The fish tape case of claim 7, wherein the fish tape is spooled into a coil within the cavity of the storage tray, and has a coupling on an inner diameter of the coil and an opposite end of the fish tape is on an outer diameter of the coil.

12. The fish tape case of claim 1, wherein the storage tray is formed of an upper tray part and a lower tray part which are in a mated condition to form the cavity of the storage tray and can be separated into a separated condition to expose a fish tape therein, and wherein a first fish tape can be positioned within the cavity of the storage tray when the storage tray is in the open position or a second fish tape can be positioned within the cavity of the storage tray when the storage tray is in the open position.

13. The fish tape case of claim 1, wherein the storage tray bears against bearing surfaces within the shell which provide for a low friction engagement between the storage tray and the shell.

14. The fish tape case of claim 1, wherein the storage tray is frictionally held within the shell.

15. The fish tape case of claim 1, wherein the storage tray moves independently of the shell and rotates as the fish tape is dispensed from or retracted into the shell.

16. A fish tape case comprising:
a shell having an upper base wall, a lower base wall, an inner side wall extending between inner perimeters of the base walls and forming a central aperture through the shell, an outer side wall extending between outer perimeters of the base walls and defining an outer diameter of the shell, the walls defining a cavity therein, the shell having an opening therethrough in communication with the cavity; and
a storage tray including an upper base wall, a lower base wall, an inner side wall extending from an inner perimeter of the lower base wall of the storage tray, an outer side wall extending between outer perimeters of the base walls of the storage tray and defining an outer diameter of the storage tray, the walls of the storage tray defining a cavity therein, the storage tray having an opening therethrough which is in communication with the cavity and through which the fish tape can pass,
wherein the storage tray is configured to rotate within the shell when the shell is held stationary.

17. The fish tape case of claim 16, wherein the storage tray bears against bearing surfaces within the shell which provide for a low friction engagement between the storage tray and the shell.

18. The fish tape case of claim 16, wherein the storage tray moves independently of the shell and rotates as the fish tape is dispensed from or retracted into the shell.

19. The fish tape case of claim 16, wherein the fish tape is formed of one of steel, nylon, plastic, fiberglass, stainless steel, and flexible steel braid.

20. The fish tape case of claim 16, wherein the fish tape is spooled into a coil within the cavity of the storage tray, and has a coupling on an inner diameter of the coil and an opposite end of the fish tape is on an outer diameter of the coil.

* * * * *